US012713303B2

(12) United States Patent
Xu et al.

(10) Patent No.: US 12,713,303 B2
(45) Date of Patent: Aug. 18, 2026

(54) METHOD AND DEVICE FOR SUPPORTING HANDOVER

(71) Applicant: Samsung Electronics Co., Ltd., Suwon-si (KR)

(72) Inventors: Lixiang Xu, Beijing (CN); Xiaoning Ma, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 17/732,330

(22) Filed: Apr. 28, 2022

(65) Prior Publication Data

US 2022/0353750 A1 Nov. 3, 2022

(30) Foreign Application Priority Data

Apr. 30, 2021 (CN) ......................... 202110482784.6
Oct. 13, 2021 (CN) ......................... 202111193174.0
(Continued)

(51) Int. Cl.
*H04W 36/00* (2009.01)
*H04W 36/08* (2009.01)
(Continued)

(52) U.S. Cl.
CPC . *H04W 36/0061* (2013.01); *H04W 36/00222* (2023.05); *H04W 36/08* (2013.01); *H04W 76/12* (2018.02); *H04W 36/324* (2023.05)

(58) Field of Classification Search
CPC ......... H04W 36/0022; H04W 36/0061; H04W 36/08; H04W 36/32; H04W 76/12;
(Continued)

(56) References Cited

U.S. PATENT DOCUMENTS

2004/0132451 A1* 7/2004 Butehorn ........... H04B 7/18584 455/445
2016/0072634 A1* 3/2016 Khan .................... H04W 76/22 370/312
(Continued)

FOREIGN PATENT DOCUMENTS

CN 112312495 A * 2/2021 ........ H04W 36/0033
WO 2018/145657 A1 8/2018
(Continued)

OTHER PUBLICATIONS

"Support of direct data forwarding for inter-system handover" 3GPP TSG-RAN WG3 #111-3; R3-210691; Jan. 25-Feb. 4, 2021; Agenda Item: 9.3.4.1; Source: CATT, China Telecom, ZTE (Year: 2021).*

(Continued)

*Primary Examiner* — Michael Y Mapa

(57) ABSTRACT

The disclosure relates to a 5G or 6G communication system for supporting a higher data transmission rate. The present disclosure provides a method and equipment for supporting a handover, which discloses: a method performed by a first node in a wireless communication network, including: receiving a handover request message from a core network node; sending a first message including an indication of direct data forwarding to a second node; and receiving a second message including information on data forwarding tunnel allocated by the second node from the second node.

6 Claims, 19 Drawing Sheets

(30) Foreign Application Priority Data

Oct. 19, 2021 (CN) ......................... 202111216583.8
Oct. 29, 2021 (CN) ......................... 202111276200.6
Nov. 1, 2021 (CN) ......................... 202111284623.2

(51) Int. Cl.
*H04W 36/32* (2009.01)
*H04W 76/12* (2018.01)

(58) Field of Classification Search
CPC ........... H04W 36/06; H04W 36/00222; H04W 36/324; H04W 36/0072; H04W 36/00695; H04W 36/14; H04W 36/023; H04W 36/0033; H04W 36/0055; H04W 36/1443
USPC ........... 370/331; 455/7, 436–444, 450–452.2
See application file for complete search history.

(56) References Cited

U.S. PATENT DOCUMENTS

| | | | | |
|---|---|---|---|---|
| 2020/0275331 | A1 | 8/2020 | Kim et al. | |
| 2020/0389810 | A1* | 12/2020 | Wang | H04W 76/11 |
| 2023/0328596 | A1* | 10/2023 | Qiao | H04W 36/0011 370/330 |
| 2023/0397055 | A1* | 12/2023 | Muller | H04W 36/14 |

FOREIGN PATENT DOCUMENTS

| | | | |
|---|---|---|---|
| WO | 2019/066544 | A1 | 4/2019 |
| WO | 2022084920 | A1 | 4/2022 |

OTHER PUBLICATIONS

Title: "Discussion on E1AP for inter-system direct data forwarding" GPP TSG-RAN WG3 Meeting #109-e, R3-205102; Online, Aug. 17-27, 2020; Source: CATT, Nokia, Nokia Shanghai Bell, China Telecom, ZTE (Year: 2020).*

Title: 3rd Generation Partnership Project; Technical Specification Group Radio Access Network; NG-RAN; NG Application Protocol (NGAP) (Release 16) 3GPP TS 38.413 V16.2.0 (Jul. 2020) (Year: 2020).*

3GPP TSG-RAN WG3 Meeting #109-e, R3-205102; Online, Aug. 17-27, 2020; Source: CATT, Nokia, Nokia Shanghai Bell, China Telecom, ZTE Title: Discussion on E1AP for inter-system direct data forwarding (Year: 2020).*

3GPP TS 38.413 V16.2.0 (Jul. 2020) 3rd Generation Partnership Project; Technical Specification Group Radio Access Network; NG-RAN; NG Application Protocol (NGAP) (Release 16) (Year: 2020).*

"3rd Generation Partnership Project; Technical Specification Group Radio Access Network; NG-RAN; E1 Application Protocol (E1AP)(Release 16)", 3GPP TS 38.463 V16.5.0 (Apr. 2021), 237 pages.

Catt et al., "Support of direct data forwarding for inter-system handover", 3GPP TSG-RAN WG3 #111-e, Jan. 25-Feb. 2021, R3-210691, 5 pages.

Nokia et al., "Support for 4g-5g Direct Data Forwarding over E1", Change Request, 3GPP TSG-RAN WG3#111-e, Jan. 25-Feb. 4, 2021, R3-211169, 10 pages.

International Search Report and Written Opinion of the International Searching Authority dated Sep. 6, 2022 in connection with International Patent Application No. PCT/KR2022/005850, 9 pages.

Supplementary European Search Report dated Sep. 9, 2024, in connection with European Application No. 22796064.8, 4 pages.

3GPP TS 38.401 V16.5.0 (Apr. 2021), Technical Specification, 3rd Generation Partnership Project; Technical Specification Group Radio Access Network; NG-RAN; Architecture description (Release 16), Apr. 2021, 79 pages.

Samsung, "TNL address allocation for direct data forwarding from E-UTRAN to NG-RAN," R3-213929, 3GPP TSG- RAN WG3 Meeting #113-e, Aug. 16-26, 2021, 2 pages.

* cited by examiner

FIG. 1

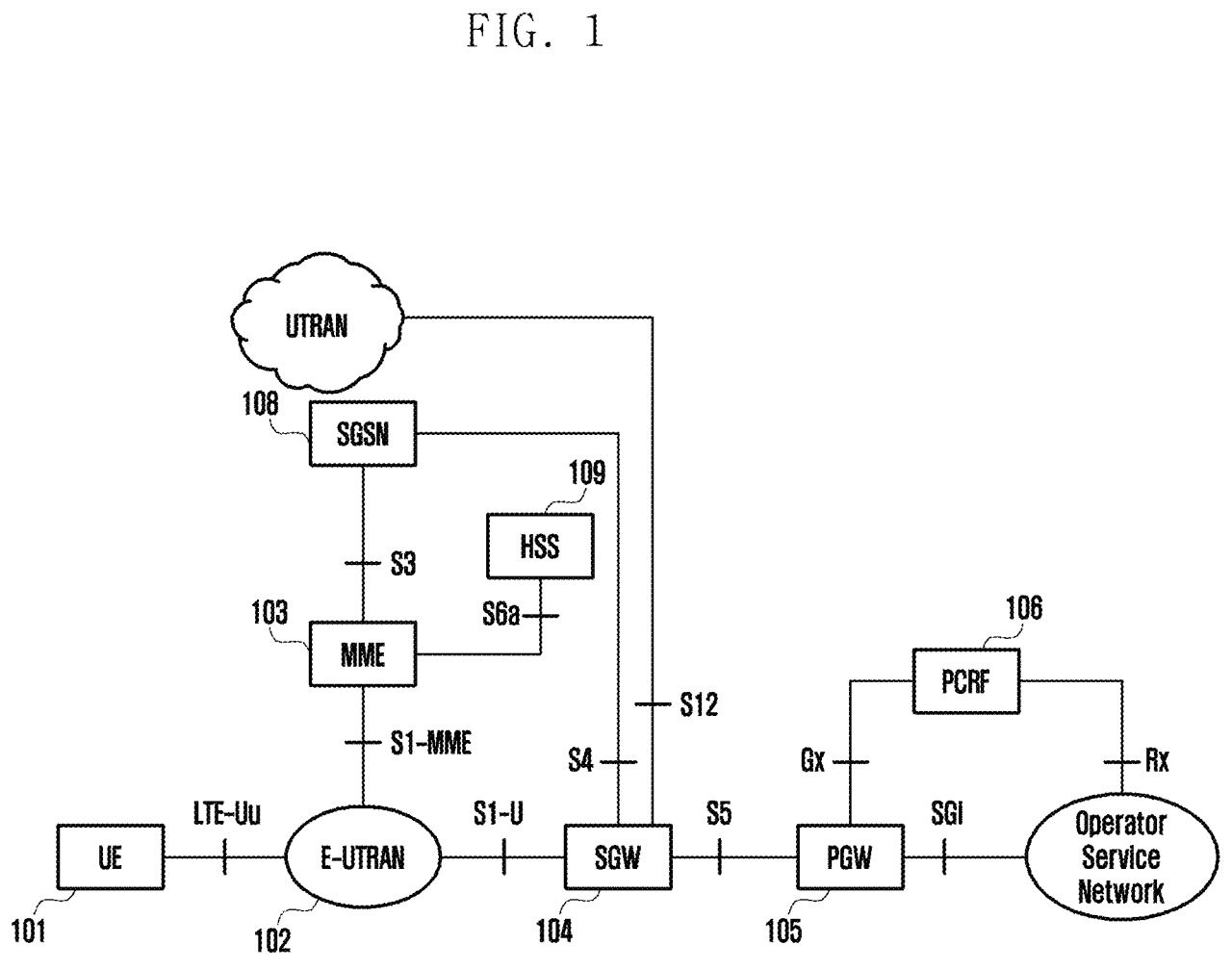

UE
101
LTE-Uu
E-UTRAN
102
S1-MME
MME
103
S3
SGSN
108
UTRAN
S6a
HSS
109
S1-U
SGW
104
S4
S12
S5
PGW
105
Gx
PCRF
106
SGi
Rx
Operator Service Network

METHOD AND DEVICE FOR SUPPORTING HANDOVER

CROSS-REFERENCE TO RELATED APPLICATIONS

This application is based on and claims priority under 35 U.S.C. § 119 to Chinese Patent Application Nos. 202110482784.6, 202111193174.0, 202111216583.8, 202111276200.6, and 202111284623.2 filed on Apr. 30, 2021, Oct. 13, 2021, Oct. 19, 2021, Oct. 29, 2021, and Nov. 1, 2021, in the CNIPA, the disclosures of which are incorporated by reference herein in their entirety.

BACKGROUND

1. Field

The application relates to wireless communication technology, particularly a method and device for supporting a handover.

2. Description of Related Art

In order to meet an increasing demand for wireless data communication services since the deployment of the 4G communication system, efforts have been made to develop an improved 5G or pre-5G communication system. Therefore, the 5G or pre-5G communication system is also called "beyond 4G network" or "post LTE system."

Wireless communication is one of the most successful innovations in modern history. Recently, the number of subscribers of wireless communication services has exceeded 5 billion, and it continues growing rapidly. With the increasing popularity of smartphones and other mobile data devices (such as tablet computers, notebook computers, netbooks, e-book readers, and machine-type devices) in consumers and enterprises, demand for wireless data services is growing rapidly. In order to meet the rapid growth of mobile data services and support new applications and deployments, it is very important to improve the efficiency and coverage of wireless interfaces.

5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service-based architecture or service-based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Following problems occur during a handover procedure: a data forwarding tunnel address may not be generated correctly, and the data forwarding tunnel cannot work properly.

According to an aspect of an embodiment of the present disclosure, there is provided a method performed by a first node in a wireless communication network, including: receiving a handover request message from a core network node; sending a first message including an indication of direct data forwarding to a second node; and receiving a second message including information on a data forwarding tunnel allocated by the second node from the second node.

According to an embodiment of the present disclosure, the first message includes one of the following information: information on an inter-system handover, or information on direct data forwarding for an inter-system handover, or information on direct data forwarding for an inter-system handover from the EPS to the 5GS.

According to an embodiment of the present disclosure, for the inter-system handover, the first message includes an indication of whether it is direct data forwarding or indirect data forwarding.

According to an embodiment of the present disclosure, for the inter-system handover and the direct data forwarding, the first message includes direct forwarding path availability.

According to an embodiment of the present disclosure, the first message includes information on the inter-system handover and information on the direct forwarding path availability.

According to an embodiment of the present disclosure, the first message includes an address of a data tunnel.

According to an embodiment of the present disclosure, the second message includes the address of the data forwarding tunnel in the matched IP version.

According to another aspect of an embodiment of the present disclosure, there is provided a method performed by a second node in a wireless communication network, including: receiving a first message including an indication of direct data forwarding from a first node; and sending a second message including information on data forwarding tunnel allocated by the second node to the first node.

According to an embodiment of the present disclosure, the method further includes: receiving the first message including an address of a data tunnel from the first node and determining information on IP version based on the address of the data tunnel; or obtaining information about a IP version of the address of the data forwarding tunnel through local configuration; or obtaining information about the IP version of the address of the data forwarding tunnel through a type of a source base station.

According to an embodiment of the present disclosure, the second message includes the address of the data forwarding tunnel in the matched IP version.

According to an aspect of an embodiment of the present disclosure, there is provided a method performed by a first node in a wireless communication network, including: receiving a handover request message from a core network node; sending a first message including information on data radio bearers to be setup to a second node; and receiving a second message in response to the first message, which includes information on the setup data radio bearers from the second node.

According to an embodiment of the present disclosure, the information on the data radio bearers to be setup includes at least one of the following information: a data radio bearer identifier, a data forwarding request list of data radio bearers on a source base station, wherein the data forwarding request list of the data radio bearers is used for data forwarding request information on one or more data radio bearers on source base stations, wherein the data forwarding request list of the data radio bearers includes at least one of the following information: a data radio bearer identifier, a data forwarding request and a QoS data flow information list.

According to an embodiment of the present disclosure, the method further includes: based on the first message, identifying that one or more data radio bearers on the source base stations are mapped to one data radio bearer on a target base station, and generating a data forwarding tunnel address for each data radio bearer on the source base stations.

According to an embodiment of the present disclosure, the second message includes at least one of the following information: a data radio bearer identifier, a data forwarding response list of the data radio bearers on the source base station, wherein the data forwarding response list of the data radio bearers is used for data forwarding response information on the data radio bearers on one or more source base stations, wherein the data forwarding response list of the data radio bearers includes at least one of the following information: a data radio bearer identifier, an address of an uplink data forwarding tunnel and an address of a downlink data forwarding tunnel.

According to an embodiment of the present disclosure, the second message includes at least one of the following information: a data radio bearer identifier and a data forwarding information response on the data radio bearer, wherein the data forwarding information response of the data radio bearer includes an address of an uplink data forwarding tunnel and/or an address of a downlink data forwarding tunnel.

According to an embodiment of the present disclosure, the method further includes: generating the same address of the data forwarding tunnel for the data radio bearers on the source base station.

According to an embodiment of the present disclosure, the method further includes: sending the same address of the data forwarding tunnel established for the data radio bearers on the source base stations to the core network node.

According to another aspect of an embodiment of the present disclosure, there is provided a method performed by a second node in a wireless communication network, including: receiving a first message including information on data radio bearers to be setup from a first node; and sending a second message in response to the first message which includes information on the setup data radio bearers to the first node.

According to another aspect of an embodiment of the present disclosure, there is provided a first node in a wireless communication network, including: a transceiver configured to receive and transmit signals; and a controller coupled with the transceiver and configured to control to perform the method of any one of the embodiments of the present disclosure.

According to another aspect of an embodiment of the present disclosure, there is provided a second node in a wireless communication network, including: a transceiver configured to receive and transmit signals; and a controller coupled with the transceiver and configured to control to perform the method of any one of the embodiments of the present disclosure.

According to another aspect of an embodiment of the present disclosure, there is provided a method performed by a first base station in a wireless communication network, including: receiving information about data forwarding tunnel from a target base station; sending information on QoS flows to be forwarded to a second base station; and sending information on the data forwarding tunnel for the second base station to the second base station according to whether a direct data forwarding path between the second base station and the target base station is available.

According to an embodiment of the present disclosure, when the direct data forwarding path between the second base station and the target base station is available, the information on the data forwarding tunnel for the second base station includes data forwarding tunnel information received by the first base station.

According to an embodiment of the present disclosure, when the direct data forwarding path between the second base station and the target base station is unavailable, the information on the data forwarding tunnel for the second base station includes information about the data forwarding tunnel between the first base station and the second base station allocated to the second base station by the first base station.

According to an embodiment of the present disclosure, the information on the data forwarding tunnel includes the information on the data forwarding tunnel allocated to an E-RAB by the target base station.

According to an embodiment of the present disclosure, the information on the QoS flows to be forwarded includes at least one of a QoS flow identifier and an E-RAB identity to which the QoS flow is mapped.

According to an embodiment of the present disclosure, the information on forwarding the QoS flow includes the information on the QoS flow forwarded on the data forwarding tunnel.

According to an embodiment of the present disclosure, the method further includes: sending information about a handover type to the second base station.

According to an embodiment of the present disclosure, the method further includes: sending data of the first base station and/or data received from the second base station to the target base station.

According to another aspect of an embodiment of the present disclosure, there is provided a method performed by a second base station in a wireless communication network, including: receiving information on QoS flows to be forwarded from a first base station; receiving information on data forwarding tunnel for forwarding data by a second base station from the first base station; and forwarding data of the QoS flow based on the information on the QoS flows to be forwarded and the information on the data forwarding tunnel for the second base station.

According to an embodiment of the present disclosure, when the direct data forwarding path between the second base station and the target base station is available, the information on the data forwarding tunnel for the second base station includes data forwarding tunnel information received by the first base station from the target base station.

According to an embodiment of the present disclosure, when the direct data forwarding path between the second base station and the target base station is unavailable, the information on the data forwarding tunnel for the second base station includes information about the data forwarding tunnel between the first base station and the second base station allocated to the second base station by the first base station.

According to the embodiment of the present disclosure, the information about the data forwarding tunnel received from the target base station includes the information on the data forwarding tunnel allocated to an E-RAB by the target base station.

According to an embodiment of the present disclosure, the information on the QoS flows to be forwarded includes at least one of a QoS flow identifier and an E-RAB identifier to which the QoS flow is mapped.

According to an embodiment of the present disclosure, the information on the QoS flows to be forwarded includes the information on the QoS flows to be forwarded on the data forwarding tunnel.

According to an embodiment of the present disclosure, the method further includes: receiving information on a handover type from the first base station.

According to an embodiment of the present disclosure, the method further includes: sending data of the second base station to the target base station or the first base station.

The present disclosure provides a method and equipment for supporting handover. With this method, the target base station can generate an appropriate address for a data forwarding tunnel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates a system architecture diagram of system architecture evolution (SAE);

DETAILED DESCRIPTION

FIGS. 1 to 19 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

FIG. 1 illustrates an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
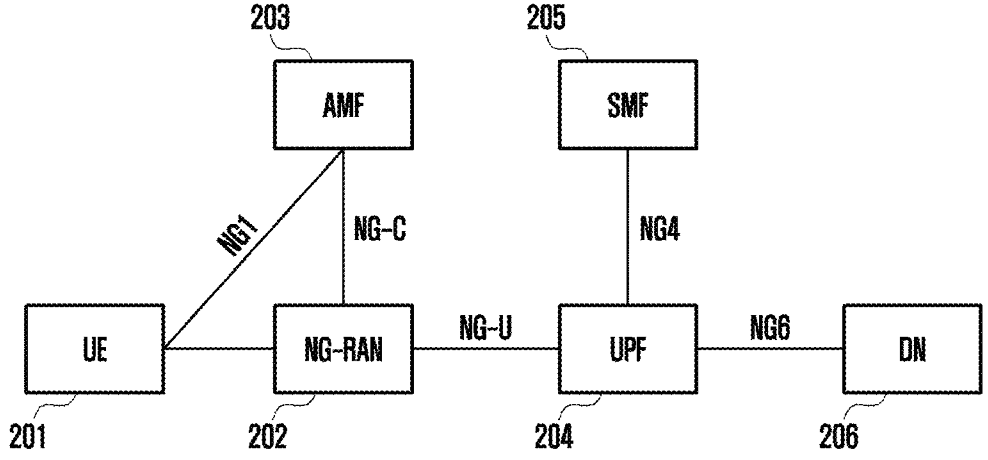
FIG. 2 illustrates a schematic diagram of the initial overall architecture of 5G.

FIG. 2 illustrates an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

Exemplary embodiments of the present disclosure are further described below with reference to the accompanying drawings.

The text and drawings are provided as examples only to help understand the present disclosure. They should not be interpreted as limiting the scope of the present disclosure in any way. Although certain embodiments and examples have been provided, based on the disclosure herein, it will be apparent to those skilled in the art that changes may be made to the illustrated embodiments and examples without departing from the scope of the present disclosure.

In 5G system, a user equipment (UE) is the terminal device used to receive data. A base station provides an interface for UE to access the wireless network. The access and mobility management function (AMF) is responsible for managing the mobility context and security information of the UE. User plane function entity (UPF) mainly provides the user plane function. Session management function entity (SMF) is responsible for session management.

A base station may include a base station centralized unit (CU) and a base station distributed unit (DU). The base station centralized unit may include a base station centralized unit-control plane entity (CU-CP) and a base station centralized unit—user plane entity (CU-UP).

When the UE moves between two base stations, in order to ensure the continuity of services, it is necessary to define a handover procedure, including an intra-system handover, such as a handover between a gNB and a gNB, a handover between a gNB and an eNB connected to 5GC; and also including an inter-system handover, such as a handover between a 5G system (5GS) and an evolved packet system (EPS).

In the inter-system handover, user plane function entity may include the UPF and part functions of the PGW function in the EPS system.

Handover procedures include the intra-system handovers and the inter-system handovers. For the intra-system handovers and the inter-system handovers, in order to avoid data loss and ensure continuity of service, data forwarding from a source base station to a target base station needs to be performed during the handovers. Data forwarding is classified into direct data forwarding and indirect data forwarding. The direct data forwarding means that the source base station directly sends the forwarded data to the target base station. The indirect data forwarding means that the source base station sends the forwarded data to the core network and the data is sent to the target base station by the core network. For the inter-system handover from the EPS to the 5GS, the indirect data forwarding is from the source base station to service gateway (SGW), the SGW sends data to the UPF, and the UPF sends the data to the target base station. In order to support data forwarding, the target base station needs to allocate one or more tunnels for the data forwarding. The data forwarding tunnel includes a tunnel endpoint identifier (TEID) and a transport layer address. The TEID may be the tunnel endpoint identifier of the general packet radio service (GPRS) tunnel protocol (GTP).

Problem 1

For the intra-system (5G system) handover, the source base station is an NG-RAN node, and if the direct data forwarding is used, the transport layer address allocated by the target base station needs to be supported by the source NG-RAN node. For the inter-system handover from the EPS to the 5GS, and if the direct data forwarding is used, the transport layer address allocated by the target base station needs to be supported by the source eNB. For the indirect data forwarding during the intra-system handover and the inter-system handover, the transport layer address allocated by the target base station needs to be supported by the core network user plane entity. For example, for the inter-system handover from the EPS to the 5GS, the transport layer address allocated by the target NG-RAN node needs to be supported by the UPF. In real networks, the operators may allocate different IP address spaces to the eNB and the NG-RAN node, or allocate different IP address spaces to the X2-U and the XN-U. The eNB supports the X2 interface. The NG-RAN node supports the Xn interface. It can be seen that when allocating the transport layer address, the target base station needs to consider: information on whether it is the direct data forwarding or the indirect data forwarding; and information on whether it is the intra-system handover or the inter-system handover.

If the target base station is of an architecture in which the user plane and the control plane are split and the centralized unit user plane entity of the target base station does not know the above information, in case that the allocated transport layer address version is not appropriate, it may be caused that the data forwarding cannot be performed, resulting in data loss and discontinuity of services.

If the target base station is in the dual connectivity mode and the secondary base station does not know the above information, in case that the allocated transport layer address version is not appropriate, it may be caused that the data forwarding cannot be performed, resulting in data loss and discontinuity of service.

Problem 2

During the procedure of a handover from an evolved packet system (EPS) to a 5G system (5GS), for direct data forwarding, data forwarding tunnel information is for each radio access bearer (E-RAB). The target base station may map data of different QoS flows on one E-RAB tunnel to different data radio bearers (DRBs). In the case that the target base station is of an architecture in which the user plane and the control plane are split, how to allocate multiple data forwarding tunnels for one DRB is an unsolved problem at present.

Problem 3

For the inter-system handover from multi-radio dual connectivity (MR-DC) connected to the 5GC to the E-UTRAN, there is no solution on how to support the direct data forwarding from the source secondary base station (SN) to the target base station at present. Specifically, what is allocated by the target base station is a data forwarding tunnel for each E-RAB, and what is configured by the source SN is DRB to which a QoS flow maps. The mapping from the QoS flow(s) to the DRB(s) at source side may be different from the mapping of the QoS flow(s) to E-RAB(s) at target side, and the source SN does not know data of the QoS flows may be forwarded to which address of the data forwarding tunnel allocated by target base station, that is, the source SN does not know the E-RAB identity to which the QoS flow is mapped. In addition, for a bearer terminated at the source SN, for the inter-system handover (such as the handover from the NG-RAN to the E-UTRAN) and the direct data forwarding, the source SN forwards the data to the target base station and the data forwarded by the source SN does not include information on the PDCP serial number (SN) and the QoS flow identifier (QFI), or the data forwarded by the source SN does not include the information on the PDCP SN and the service data adaptation protocol (SDAP) header; however, for the intra-system handover, the data forwarded on the data radio bearer (DRB) tunnel may carry information on the PDCP SN and the QFI. At present, the SN does not know whether it is intra-system handover or inter-system handover.

Problem 4

For the handover from the single connectivity to the dual connectivity, the direct data forwarding path between the source base station and the target master base station is unavailable, and the direct data forwarding path between the source base station and the target secondary base station is available. At present, there is no solution on how to support the direct data forwarding from the source base station to the target secondary base station or from the source base station to the target master base station, which includes the intra-system handover from the NG-RAN node to the MR-DC connected to the 5GC and the inter-system handover from the NG-RAN node to a dual connectivity (EN-DC) of the evolved universal terrestrial radio access (E-UTRA) and the new radio (NR).

The disclosure provides a method for supporting handover. With this method, the problem of data forwarding during the intra-system handover and the inter-system handover can be solved, thereby avoiding data loss. Furthermore, the problem of data forwarding tunnel allocation can be solved, so that the target base station can allocate appropriate data forwarding tunnel, so that the source base station can know data of which QoS flow is forwarded through which tunnel allocated by the target base station, thereby ensuring the continuity of the services during the handover procedure.

Problem 1A:

In the procedure of the handover from the evolved packet system (EPS) to the 5G system (5GS), the source base station is the eNB and the target base station is the gNB. The data forwarding between the source base station and the target base station can be configured as a direct forwarding or the indirect forwarding. If it is configured as the direct forwarding, the target base station needs to generate one or more addresses of data forwarding tunnels connected to the source base station. The data that has been sent to the source base station is forwarded to the target base station through the data forwarding tunnels. If it is configured as the indirect forwarding, the target base station needs to generate one or more addresses of data forwarding tunnels connected to the user plane function entity. The data that has been sent to the source base station is forwarded to the target base station through the data forwarding tunnel between the source base station and the user plane function entity, and the data forwarding tunnel between the user plane function entity and the target base station.

The source base station or user plane function entity may support only IPv4 address, or only IPv6 address or both IPv4 and IPv6 addresses. The target base station needs to generate an address that matches the source base station or the user plane function entity. In the target base station, the function of generating an IP address is performed by the CU-UP. However, at present, there is a lack of a mechanism to enable the CU-UP to know the version of the IP address of the data forwarding tunnel to be setup used by the peer node, so that the CU-UP cannot generate an appropriate data forwarding tunnel address.

A Method for Supporting Handover Includes, for the case which is configured as indirect forwarding, that Node 1 sends an inter-node interface message 1 to Node 2, and the message includes one piece of information. The information indicates that the data forwarding is configured as direct forwarding. When the message does not include the said information, it means that the data forwarding is configured as indirect forwarding.

It may also be that the information indicates that the data forwarding is configured as indirect forwarding. When the message does not include the said information, it means that the data forwarding is configured as direct forwarding.

It may also be that the information indicates that the data forwarding is configured as indirect forwarding or indirect forwarding.

The node 1 sends an inter-node interface message 2 to the node 2, and the message includes a data tunnel address, which may be a data tunnel address for uplink. The message 2 and the message 1 may be the same or different. The message 2 may be sent before or after the message 1.

After the node 2 receives the message 1, the node 2 may determine whether the data forwarding is direct forwarding or indirect forwarding. After the node 2 receives the message 2, according to the data tunnel address, the Node 2 may determine the IP version used by the address. The node 2 may generate a data forwarding tunnel address that matches this IP version.

The node 2 sends an inter-node message 3 to the node 1, the message includes the address of the data forwarding tunnel which is generated for indirect forwarding, and there may be one or more addresses.

For the case which is configured as direct forwarding, the node 2 may know the version of the IP address of the data forwarding tunnel to be setup used by the peer node through local configuration (for example, O & M configuration), and generate the data forwarding tunnel address for direct forwarding according to this information. Or the node 2 may generate the data forwarding tunnel address for direct forwarding at its own discretion according to other information. For example, in the scenario of the handover from the EPS to the 5GS, the source base station is an eNB which is a base station belonging to the 4G, the node 2 is the CU-UP of the target base station, and the node 2 can consider that the source base station supports IPv4, thus the data forwarding tunnel address for direct forwarding generated by the node 2 is an IPv4 address.

In the method, the node 1 may be a CU-CP and the node 2 may be a CU-UP.

The inter-node interface may be an E1 interface.

When the inter-node interface is the E1 interface, the inter-node interface message includes but is not limited to at least one of the following messages: BEARER CONTEXT SETUP REQUEST, BEARER CONTEXT SETUP RESPONSE, BEARER CONTEXT MODIFICATION REQUEST, BEARER CONTEXT MODIFICATION RESPONSE, and a newly defined E1 interface message.

According to the method, the node 2 may generate a data forwarding tunnel address of the data forwarding tunnel to be setup that matches the peer node, so as to ensure that data forwarding can work properly.

Problem 2A

During the procedure of the handover from the evolved packet system (EPS) to the 5G system (5GS), the source base station is an eNB and the target base station is a gNB. The data forwarding between the source base station and the target base station can be configured as direct forwarding or indirect forwarding. If it is configured as direct forwarding, the target base station needs to generate one or more addresses of data forwarding tunnels connected to the source base station.

The target base station may decide to map the data of multiple data radio bearers (DRBs) in the source base station to a data radio bearer in the target base station. If it is configured as direct forwarding, the existing mechanism cannot solve the problem of how to enable the CU-UP to generate data forwarding tunnel addresses that can be used for multiple data forwarding tunnels.

There are two options for supporting handover.

Option 1

Node 1 sends an inter-node interface message 1 to node 2, the message includes a list of data radio bearers (DRBs) needed to be setup. The list includes one or more DRB information needed to be setup. The DRB information includes but is not limited to at least one of the following information:

- a data radio bearer identifier, for example, which may be a DRB ID; or
- a list of DRB data forwarding requests on the source base station, which are mapped to the current DRB.

The list of DRB data forwarding requests includes one or more DRB data forwarding request information on the source base station. The DRB data forwarding request information includes but is not limited to at least one of the following information:

- a data radio bearer identifier, for example, which may be a DRB ID;
- a Data Forwarding Request, indicating that data forwarding is applied to uplink data forwarding, downlink data forwarding, or uplink and downlink data forwarding; or
- a list of information on QoS data flow to be forwarded.

Wherein the list of information on QoS data flow to be forwarded includes but is not limited to at least one of the following information:

- a QoS data flow identifier, for example, which may be a QoS Flow ID; or
- a QoS data flow mapping indication, indicating that the uplink data, downlink data or uplink and downlink data in the data flow are mapped to the current data radio bearer.

According to the message 1, the node 2 can determine that one or more DRBs on the source base station are mapped to one DRB on the target base station, and data forwarding is needed. The node 2 generates one or more data forwarding tunnel addresses for the DRB on the target base station according to this determination.

The node 2 sends an inter-node interface message 2 to the node 1, the message includes a list of DRBs which are successfully set, and the list includes information on one or more DRBs which are successfully setup. The information on DRBs which are successfully set includes but is not limited to at least one of the following information:

- a data radio bearer identifier, for example, which may be a DRB ID; or
- a list of DRB data forwarding responses on the source base station, which is mapped to the current DRB.

The list of data forwarding responses includes information on one or more DRB data forwarding responses on the source base station. The information on the DRB data forwarding response includes but is not limited to at least one of the following information:

- a data radio bearer identifier, for example, which may be a DRB ID;
- an uplink data forwarding tunnel address; or
- a downlink data forwarding tunnel address.

The tunnel address includes but is not limited to at least one of the following information:

- a transport layer address, for example, an IPv4 address or an IPv6 address; or
- a Tunnel Endpoint Identifier, for identifying an endpoint of the tunnel.

In this way, the node 1 obtains the one or more data forwarding tunnel addresses of DRBs on source base station which are mapped to a DRB on the target base station. The advantage of option 1 is that each DRB on the source base station has a unique data forwarding tunnel address, which is convenient for the target base station to process.

Option 2

Node 1 sends an inter-node interface message 1 to node 2, and the message includes a list of DRBs to be setup. The list includes information on one or more DRBs to be setup. The information on DRB includes but is not limited to at least one of the following information:

- a data radio bearer identifier, for example, which may be a DRB ID; or
- a DRB data forwarding information request.

The data forwarding information request includes a data forwarding request, which indicates that data forwarding is applied to uplink data forwarding, downlink data forwarding, or uplink and downlink data forwarding; optionally, it also includes a list of information on QoS data flow to be forwarded.

The node 2 sends an inter-node interface message 2 to the node 1, the message includes a list of DRBs which are successfully setup, and the list includes one or more pieces of information on DRBs which are successfully setup. The information on DRBs which are successfully setup includes but is not limited to at least one of the following information:

- a Data radio bearer identifier, for example, which may be a DRB ID; or
- a DRB data forwarding information response.

The DRB data forwarding information response includes an uplink data forwarding tunnel address and/or a downlink data forwarding tunnel address.

When the node 1 is a CU-CP and the node 2 is a CU-UP, the behavior of CU-CP changes. The CU-CP maintains the mapping relationship between the DRB of the source base station and the DRB of the target base station. When the CU-CP needs to inform other nodes of the DRB of the source base station and the corresponding data forwarding tunnel, for example, during the procedure of handover from the EPS system to the 5G system, the CU-CP needs to send to the AMF the information on the DRB of the source base station accepting data forwarding and the corresponding data forwarding tunnel, if the multiple DRBs of the source base station are mapped to one DRB of the target base station, then the CU-CP needs to set the same data forwarding tunnel address for the multiple DRBs of the source base station in the message sent to the AMF. In the existing mechanism, each DRB of the source base station may have a unique data forwarding tunnel address. Therefore, Option 2 adds a new behavior to the CU-CP. Option 2 has the advantage that it neither affects the behavior of the CU-UP, nor affects E1 technical specification between the CU-CP and the CU-UP.

In the method, the node 1 may be a CU-CP and the node 2 may be a CU-UP.

The inter-node interface may be an E1 interface.

When the inter-node interface is E1 interface, the inter-node interface message includes but is not limited to at least one of the following messages: BEARER CONTEXT SETUP REQUEST, BEARER CONTEXT SETUP RESPONSE, BEARER CONTEXT MODIFICATION REQUEST, BEARER CONTEXT MODIFICATION RESPONSE, and a newly defined E1 interface message.

According to the method, the node 2 may generate the same data forwarding tunnel addresses for multiple DRBs of the source base station, and the node 1 may setup the same data forwarding tunnel address of for multiple DRBs of the source base station and inform other nodes of these information, thereby ensuring that data forwarding may work properly after multiple DRBs of the source base stations are mapped to one DRB of the target base station.

The application provides a method for supporting handover. In order to make the objectives, technical solutions and advantages of the application clearer, the application will be further explained in detail with reference to the attached drawings and embodiments. Detailed description of steps irrelevant to the application, such as the interaction process between core network nodes, is omitted here.

Figure 3:
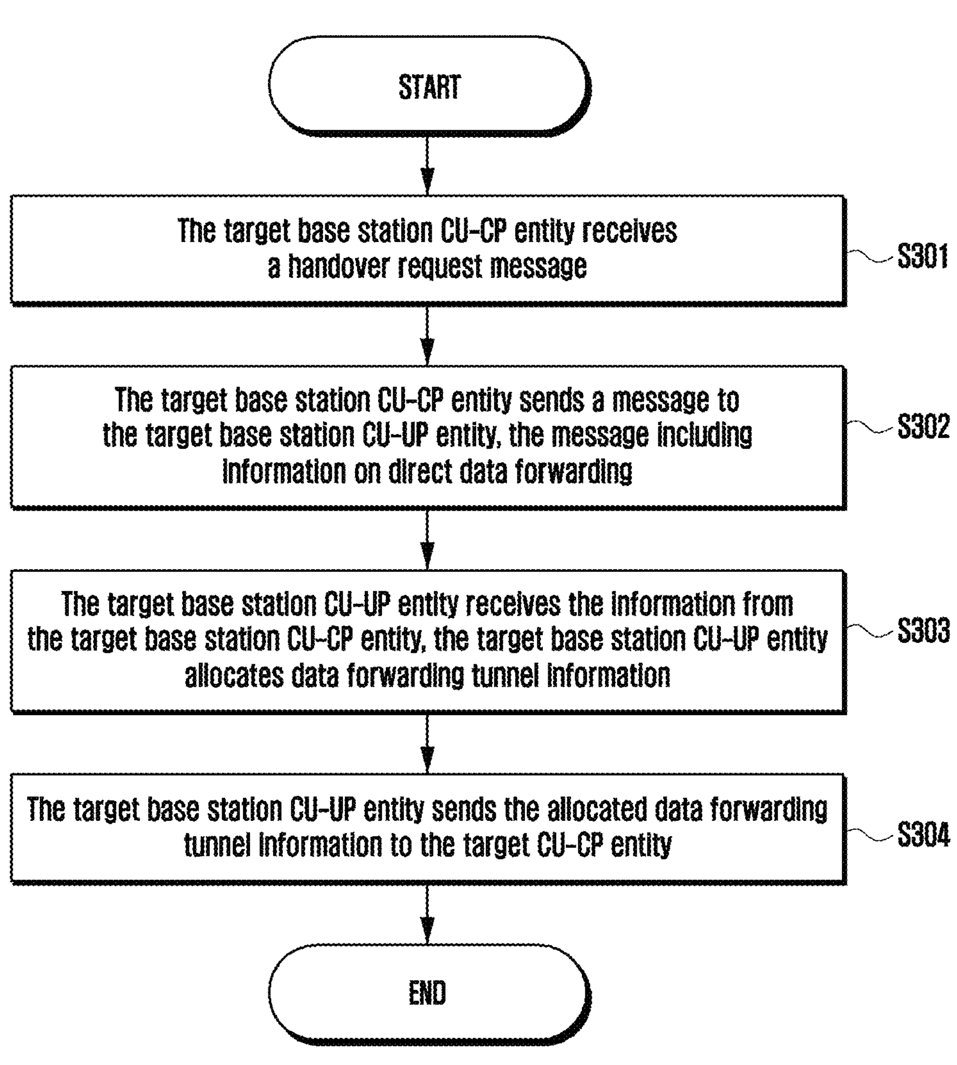
FIG. 3 illustrates a schematic diagram of a first embodiment according to the embodiment of the present disclosure.

FIG. 3 illustrates a schematic diagram of a first embodiment of the present disclosure, which is mainly described from the perspective of the target base station. It includes the following steps.

At step 301, the target base station centralized unit-control plane entity (CU-CP) receives a handover request message from the core network. The handover request message includes the handover type. The handover types may be an intra-5G system (Intra5GS) handover, a handover from the 5GS to the EPS, a handover from the EPS to the 5GS, a handover from the 5GS to the Universal Terrestrial Radio access (UTRA), etc. The message includes a data forwarding not possible. The message may also include information on direct forwarding path availability. For the handover from the EPS to the 5GS, when the data forwarding is possible (for example, the information element of data forwarding not possible does not exist), absence of information on direct forwarding path availability means that indirect data forwarding is possible. The message includes the uplink user plane transport layer address.

At step 302, the target CU-CP sends a message to the target base station centralized unit-user plane entity (CU-UP). The message includes information on direct data forwarding. The message may also include information on inter-system handover. The message may also include information on inter-system handover direct data forwarding. The message may also include information on direct data forwarding of the inter-system handover from the EPS to the 5GS. The target CU-CP can inform the target CU-UP of the information on the inter-system handover and/or the direct data forwarding in a variety of specific ways, including:

- Way 1: For inter-system handover, the message includes the indication whether it is direct data forwarding or indirect data forwarding. The indication whether it is direct data forwarding or indirect data forwarding may be direct data forwarding or indirect data forwarding. For intra-system handover, the indication does not exist;
- Way 2: For inter-system handover and direct data forwarding, the message includes the direct forwarding path availability. For the intra-system handover or for the inter-system handover and the indirect data forwarding, the indication does not exist; and/or
- Way 3: The message includes the information on inter-system handover and the information on direct forwarding path availability. When the target CU-UP receives the information on inter-system handover and the information on direct forwarding path availability, the CU-UP knows that it is direct data forwarding for inter-system handover. When the target CU-UP receives the information on inter-system handover but does not receive the information on direct forwarding path availability, the CU-UP knows that it is the indirect data forwarding for inter-system handover and. The information on inter-system handover may be explicit or implicit. Implicit ways include that: when the CU-UP receives indication information that packet data convergence protocol (PDCP) serial number (SN) is discarded from the CU-CP, it means the inter-system handover; or the CU-CP requests, from the CU-UP, the information on data forwarding for inter-system handover; or the CU-CP requests, from the CU-UP, the data forwarding information from DRB of the E-UTRAN.

There may be other specific methods without the main content of the present disclosure being affected.

The message may be a bearer context setup request message or a bearer context modification request message. The message includes a data forwarding information request. The message includes the uplink user plane transport layer address.

At step 303, the target CU-UP receives the message of step 302. If the target CU-CP requests the data forwarding tunnel information, the target CU-UP allocates corresponding data forwarding tunnel information according to the request. The data forwarding tunnel information includes a TEID and a transport layer address. If the target CU-UP receives the information on the inter-system handover or the handover from the EPS to the 5GS and direct data forwarding, the target CU-UP allocates the transport layer address version supported by the corresponding source base station or allocates the transport layer address from the transport layer address space reserved for the source base station.

For example, for the inter-system handover from the EPS to the 5GS and the direct data forwarding, the target CU-UP allocates the transport layer address version or the address space for the eNB or the X2-U. The target CU-UP knows the transport layer address version supported by the source base station or the source eNB or the X2-U according to the operation and maintenance (O & M) configuration; or the target CU-UP knows the transport layer address space reserved for the source base station or the source eNB or the X2-U according to the O & M configuration. For the indirect data forwarding for the inter-system handover, the target CU-UP knows the transport layer address version supported by the UPF according to the received information on the transport layer address of NG uplink (UL) user plane (UP), and then allocates the transport layer address in the corresponding version. If the transport layer address of the NG UL UP received by the target CU-UP includes addresses of the IPv4 and the IPv6, the target CU-UP allocates the transport layer address of the user data forwarding in the corresponding version according to the transport layer address version supported by the target CU-UP itself.

For the intra-system handover, the target CU-UP allocates the transport layer address for data forwarding according to the transport layer address version supported in the system. The target CU-UP knows the transport layer address version supported in the system according to the O & M configuration.

Corresponding to Way 2 in which the target CU-CP can inform the target CU-UP of the information on the inter-system handover and/or direct data forwarding, in the case of the inter-system handover and the direct data forwarding, the target CU-UP allocates the transport layer address version supported by the corresponding source base station or allocates the transport layer address from the transport layer address space reserved for the source base station, which is the same as above and will not be repeated here. Corresponding to the indirect data forwarding for the inter-system handover or the intra-system handover, the target CU-UP allocates the transport layer address for data forwarding in the existing way. The target CU-UP allocates the transport layer address for data forwarding according to the transport layer address version supported in the system. The target CU-UP knows the transport layer address version supported in the system according to the O & M configuration.

At step 304, the target CU-UP sends information on the allocated data forwarding tunnel to the target CU-CP. The message may be a bearer context setup response message or a bearer context modification response message.

The target CU-CP sends the data forwarding tunnel information to the core network or to the source base station. For the inter-system handover, the target CU-CP sends a handover request acknowledge message to the core network, which includes the data forwarding tunnel information. The target CU-CP sends the data forwarding tunnel information to the source base station through the core network. For the intra-system handover, the target CU-CP can send the data forwarding tunnel information to the source base station through the inter-base station interface (such as the Xn).

The source base station forwards data to the target CU-UP according to the received data forwarding tunnel information. Because the transport layer address in the data forwarding tunnel information matches the transport layer address version used by the source base station, data forwarding can be performed properly. Thus, it is ensured that the user data are not lost and the user experience is not compromised.

So far, the description of the first embodiment of the present disclosure has been completed. With this method, the target base station allocates appropriate data forwarding tunnel information, which ensures data forwarding to be performed properly, reduces data loss during the handover procedure, and improves the handover performance.

The second embodiment describes the case where the handover is from the EPS system to the 5G system and the data forwarding from the source base station to the target base station is configured as direct forwarding.

Figure 4:
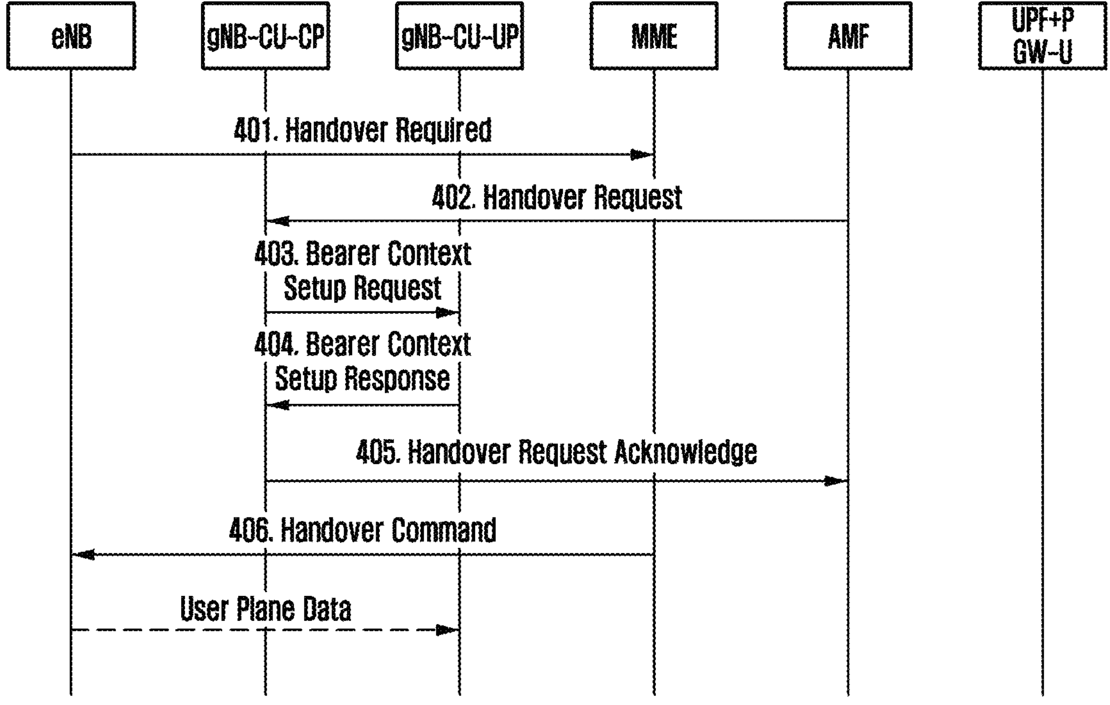
FIG. 4 illustrates a schematic diagram of a second embodiment according to the embodiment of the present disclosure.

FIG. 4 illustrates a schematic diagram of the second embodiment, which includes the following steps.

At Step 401, the eNB sends a 51 message Handover Required to the MME. The message includes information on handover type, which indicates that this handover is a handover from the EPS system to the 5G system (EPSto5GS). The MME sends a relocation request message to the AMF.

At Step 402, the AMF sends an Ng message Handover Request to the gNB-CU-CP. The message includes the information on the handover type and a list of information on PDU sessions required to be setup, the list includes one or more pieces of information on the PDU sessions. The information on the PDU sessions includes an address of uplink data tunnel and a list of information on QoS flows required to be setup.

At Step 403, the gNB-CU-CP sends an E1 message BEARER CONTEXT SETUP REQUEST to gNB-CU-UP. The message includes a list of information on PDU sessions that gNB-CU-CP requires the gNB-CU-UP to setup, and the list includes information on one or more PDU sessions. The information on the PDU session includes the address of the uplink data tunnel carried in step 402 and a list of information on DRB that the gNB-CU-CP requires the gNB-CU-UP to setup. The information on the PDU session also includes information on direct forwarding path availability. The list of information on DRB includes information on one or more DRBs, which includes a DRB data forwarding information request.

The gNB-CU-UP determines that a data forwarding tunnel address needs to be generated for the DRB according to the information on DRB data forwarding information request and determines that data forwarding is direct forwarding according to the information on the direct forwarding path availability. The gNB-CU-UP decides the version of the IP address in the data forwarding tunnel address through O & M configuration, such as IPv4 or IPv6, and then generates a data forwarding tunnel address that matches the IP version used by eNB.

At Step 404, the gNB-CU-UP sends an E1 message BEARER CONTEXT SETUP RESPONSE to the gNB-CU-CP. The message includes a list of information on PDU sessions which are successfully setup, and the list includes information on one or more PDU sessions. The PDU session information includes a list of information on DRBs which are successfully setup. The list of information on DRBs includes information on one or more DRBs, the information includes a data forwarding tunnel address for forwarding downlink data.

At Step 405, the gNB-CU-CP sends a message Ng, HANDOVER REQUEST ACKNOWLEDGE, to the AMF. The message includes a list of information of PDU sessions accepted by the gNB-CU-CP, and the list includes information on one or more PDU sessions accepted by the gNB-CU-CP. The information on PDU sessions includes a data forwarding response E-RAB list, which includes information on one or more E-RABs for which the gNB-CU-CP accepts data forwarding. The information on the E-RAB includes an E-RAB ID and a data forwarding tunnel address for forwarding downlink data which is corresponding to the E-RAB. The AMF sends a relocation response message to the MME.

At Step 406, the MME sends an S1 message HANDOVER COMMAND to the eNB. The message includes a list of information on an E-RAB for forwarding data, the information includes the E-RAB ID and the data forwarding tunnel address for forwarding downlink data which is corresponding to the E-RAB.

In this way, the eNB forwards data to the gNB-CU-UP according to the data forwarding tunnel address indicated in step 406. Because the data forwarding tunnel address matches the IP version used by the eNB, data forwarding can be performed properly. Thus, it is ensured that the user data are not lost and the user experience is not compromised.

The third embodiment describes the case that the handover is from the EPS system to the 5G system and the data forwarding from the source base station to the target base station is configured as indirect forwarding.

Figure 5:
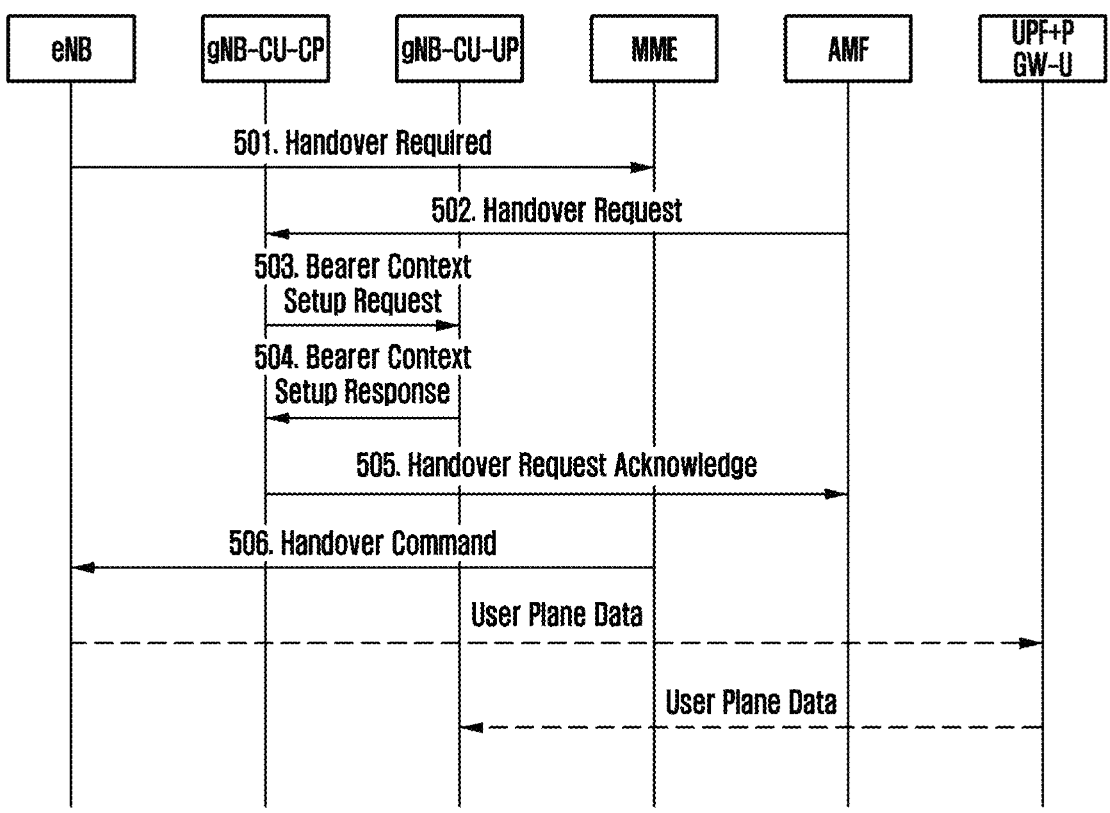
FIG. 5 illustrates a schematic diagram of a third embodiment according to the embodiment of the present disclosure.

FIG. 5 illustrates a schematic diagram of the third embodiment, which includes the following steps.

At Step 501, an eNB sends, to an MME, an 51 message Handover Required. The message includes information on Handover Type, which indicates that this handover is a handover from the EPS system to the 5G system (EPSto5GS). The MME sends a relocation request message to the AMF.

At Step 502, an AMF sends an Ng message Handover Request to a gNB-CU-CP. The message includes information on handover type and a list of resource information on PDU session requested to be setup, the list includes resource information on one or more PDU sessions. The resource information on the PDU session includes an uplink data tunnel address and a list of information on QoS flow requested to be setup.

At Step 503, the gNB-CU-CP sends a BEARER CONTEXT SETUP REQUEST to a gNB-CU-UP. The message includes a list of information on PDU session that the gNB-CU-CP requests the gNB-CU-UP to setup, and the list includes information on one or more PDU sessions. The information on the PDU session includes the uplink data tunnel address carried in the previous step and a list of information on DRBs that the gNB-CU-CP requests the gNB-CU-UP to setup. The list of information on DRBs to be setup includes a DRB data forwarding information Request.

The gNB-CU-UP determines that a data forwarding tunnel address needs to be generated for this DRB according to the information, the DRB data forwarding information Request. However, the information on PDU session does not include the information, direct forwarding path availability, and based on that, the gNB-CU-UP determines that the data forwarding is configured as indirect forwarding, so that the data need to be forwarded to the gNB-CU-UP through the UPF+PGW-U node. The gNB-CU-UP can determine the IP version supported by the UPF+PGW-U node, such as IPv4 or IPv6, according to the uplink data tunnel address, and then generate the data forwarding tunnel address that matches the IP version used by the UPF+PGW-U node.

At Step 504, the gNB-CU-UP sends an E1 message, BEARER CONTEXT SETUP RESPONSE, to the gNB-CU-CP. The message includes a list of information on PDU sessions which are successfully setup, and the list includes information on one or more PDU sessions. The information on the PDU session includes a list of information on DRBs which are successfully setup. The list of information on DRBs includes a data forwarding tunnel address for forwarding downlink data.

At Step 505, the gNB-CU-CP sends an Ng message, HANDOVER REQUEST ACKNOWLEDGE, to the AMF. The message includes a list of information on PDU sessions accepted by the gNB-CU-CP, and the list includes information on one or more PDU sessions accepted by the gNB-CU-CP. The information on the PDU session includes a data forwarding response E-RAB list, which includes information on one or more E-RABs for which the gNB-CU-CP accepts data forwarding. The information on the E-RAB includes an E-RAB ID and a data forwarding tunnel address for forwarding downlink data which is corresponding to the E-RAB. The AMF sends a relocation response message to the MME.

At Step 506, the MME sends a S1 message HANDOVER COMMAND to the eNB. The message includes a list of information on E-RABs of forwarding data, the information includes an E-RAB ID and a data forwarding tunnel address for forwarding downlink data which is corresponding to the E-RAB.

In this way, the eNB forwards data to the UPF+PGW-U node, and then UPF+PGW-U node forwards data to the gNB-CU-UP. Because the data forwarding tunnel address of the gNB-CU-UP matches the IP version used by the UPF+PGW-U node, data forwarding can be performed properly. Thus, it is ensured that the user data are not lost and the user experience is not compromised.

The fourth embodiment describes the case that the handover is from the EPS system to the 5G system, the data forwarding from the source base station to the target base station is direct forwarding, and multiple DRBs of the source base station are mapped to one DRB of the target base station.

Figure 6:
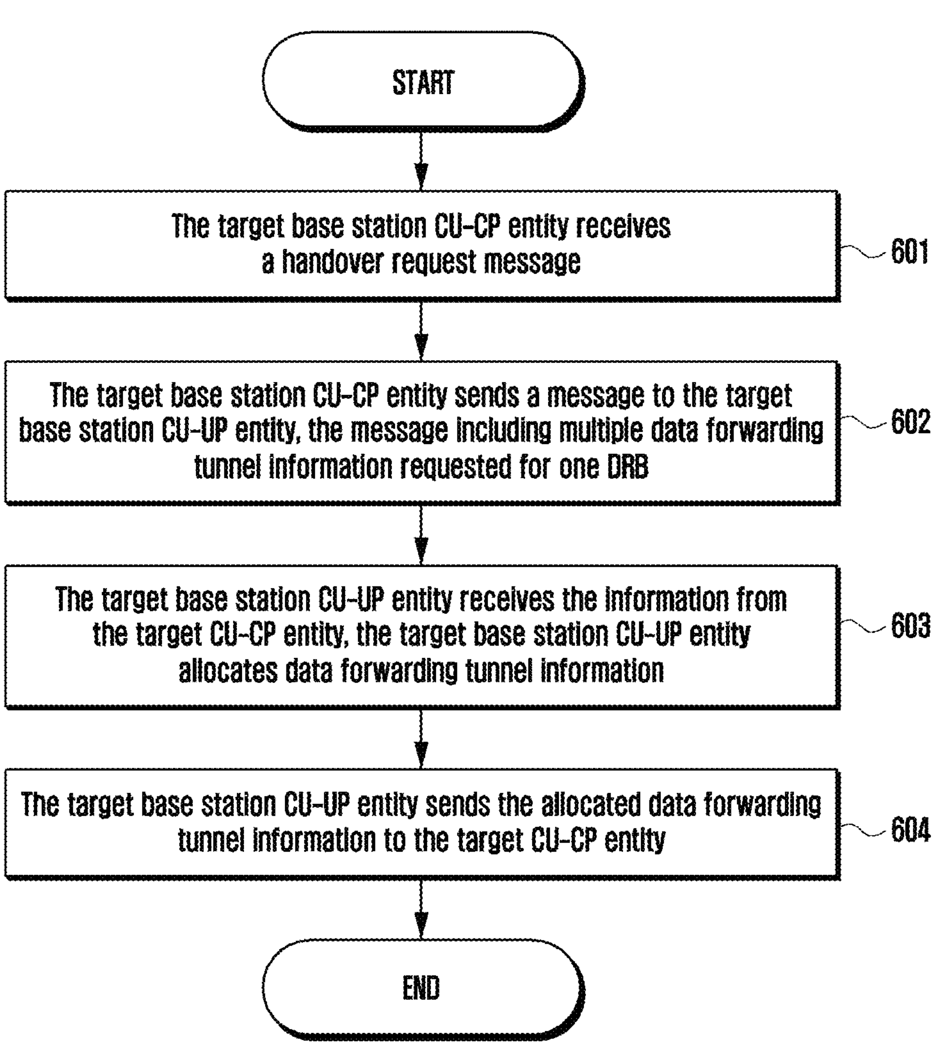
FIG. 6 illustrates a schematic diagram of a fourth embodiment according to the embodiment of the present disclosure.

FIG. 6 illustrates a schematic diagram of the fourth embodiment of the present disclosure, which is mainly described from the perspective of the target base station. It includes the following steps.

At step 601, the target base station centralized unit-control plane entity (CU-CP) receives a handover request message from the core network. The handover request message includes a handover type. The handover type may be an intra-5G system (Intra5GS) handover, a handover from the 5GS to the EPS, a handover from the EPS to the 5GS, a handover from the 5GS to the Universal Terrestrial Radio access (UTRA), etc. The message includes data forwarding not possible. The message may also include information on direct forwarding path availability. For the handover from the EPS to the 5GS, when data forwarding is possible (for example, the information element of data forwarding not possible does not exist), absence of information on direct forwarding path availability means that indirect data forwarding is possible.

The message includes a PDU session resource setup list. The PDU session resource setup request transfer included in the PDU session resource setup information includes a list of QoS flows to be setup. The QoS flow to be setup includes a QoS flow identifier and an enhanced access bearer (E-RAB) identifier corresponding to the QoS flow.

The message includes a list of E-RAB information. The E-RAB information includes an E-RAB identifier and downlink forwarding, wherein the downlink forwarding refers to the downlink data forwarding for the E-RAB provided by the source base station.

At step 602, the target CU-CP sends a message to the target base station centralized unit—user plane entity (CU-UP). The message may be a bearer context setup request message. The CU-CP decides mapping from the QoS flow in the PDU session to the DRB. The message includes a list of DRBs to be setup. The list of DRBs to be setup includes the DRB identifiers and information on the QoS flow mapped to the DRBs at the target side. If the source base station requests the downlink data forwarding of the E-RAB, the information on DRBs to be setup includes a list of information on DRB data forwarding information request from the E-UTRAN. The information on DRB data forwarding information request from the E-UTRAN includes a data forwarding request and a list of QoS flows forwarded on the forwarding tunnel. The data forwarding request can be uplink, downlink, or uplink and downlink. For the inter-system handover, data forwarding is downlink. The DRB data forwarding information request from the E-UTRAN includes the information on multiple data forwarding tunnels requested for one DRB, including one or more QoS flows mapped to each tunnel, which can be other names without affecting the main content of the present disclosure.

Including the list of the DRB data forwarding information request information from the E-UTRAN in the information on DRBs to be setup can solve the problem of how to allocate the data forwarding tunnel per E-RAB at the E1 interface, in the case that multiple QoS flows mapped to different E-RABs at the source side are mapped to the same DRB at the target side. While solving the problem, it can avoid re-defining a list parallel to the DRBs to be setup, and requiring complexity of associating the two lists, thereby simplifying processing at the CU-UP end and reducing complexity of implementation.

At step 603, the target CU-UP receives the message of step 602. If the target CU-CP requests information on the DRB data forwarding tunnel from the E-UTRAN, the target CU-UP allocates the corresponding data forwarding tunnel information according to the request. The target CU-UP allocates the data forwarding tunnel information according to the received information. The data forwarding tunnel information includes a TED and a transport layer address. The data forwarding tunnel information is per E-RAB.

At step 604, the target CU-UP sends information on the allocated data forwarding tunnel to the target CU-CP. The message may be a bearer context setup response message or a bearer context modification request message.

The message includes a list of PDU session resource setup responses. The information on the PDU session resource setup includes a list of DRBs to be setup. The information on DRBs to be setup includes DRB identifiers. The information on DRBs to be setup may also include a list of the information on DRB data forwarding responses from the E-UTRAN. The information on DRB data forwarding response from the E-UTRAN includes data forwarding information. The data forwarding information includes a TEID and a transport layer address. The information on DRB data forwarding response from the E-UTRAN includes information on multiple data forwarding tunnels allocated for one DRB, which can be other names without affecting the main content of the present disclosure.

Including the list of information on the DRB data forwarding responses from the E-UTRAN in the information on DRBs to be setup can solve the problem of how to allocate the data forwarding tunnel per E-RAB at the E1 interface, in the case that multiple QoS flows mapped to different E-RABs at the source side are mapped to the same DRB at the target side. While solving the problem, it can avoid re-defining a list parallel to the DRB to be setup, and requiring complexity of associating the two lists, thereby simplifying the processing at the CU-UP end and reducing the complexity of implementation.

The target CU-CP sends the data forwarding tunnel information to the core network or to the source base station. For the inter-system handover, the target CU-CP sends a handover request acknowledge message to the core network, and the message includes the data forwarding tunnel information. The target CU-CP sends the data forwarding tunnel information to the source base station through the core network. For the intra-system handover, the target CU-CP can send the data forwarding tunnel information to the source base station through the inter-base station interface (such as the Xn).

The source base station forwards data to the target CU-UP according to the received data forwarding tunnel information. The source base station forwards the data in the existing way.

So far, the description of the fourth embodiment of the present disclosure has been completed. With this method, the target base station allocates appropriate data forwarding tunnel information, which ensures data forwarding to be performed properly, reduces data loss during the handover procedure, improves the handover performance, reduces impact on the eNB, and reduce processing complexity of the CU-CP and the CU-UP.

Figure 7:
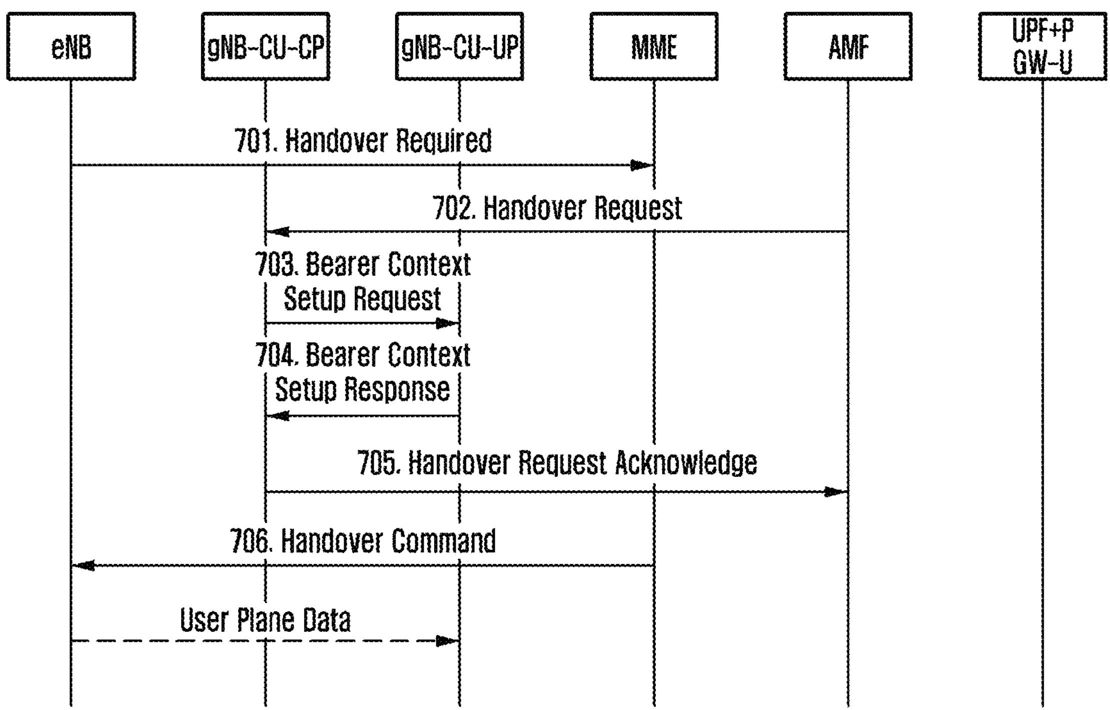
FIG. 7 illustrates a schematic diagram of a fifth embodiment according to the embodiment of the present disclosure.

FIG. 7 illustrates a schematic diagram of the fifth embodiment, which includes the following steps.

At Step 701, an eNB sends an S1 message, Handover Required, to a MME. The message includes information on Handover Type, which indicates that the handover is a handover from the EPS system to the 5G system (EPSto5GS). The MME sends a relocation request message to an AMF.

At Step 702, the AMF send an Ng message Handover Request to a gNB-CU-CP. The message includes the information on handover type and a list of information on PDU session requested to be setup, the list includes information on one or more PDU sessions. The information on the PDU session includes an uplink data tunnel address and a list of information on QoS flows required to be setup.

At Step 703, For one or more PDU sessions, the gNB-CU-CP decides to map multiple DRBs of the source base station to one DRB at the target side.

The gNB-CU-CP sends an E1 message BEARER CONTEXT SETUP REQUEST to the gNB-CU-UP. The message includes a list of information on PDU sessions that gNB-CU-CP requests gNB-CU-UP to setup, and the list includes information on one or more PDU session. The information on PDU session includes the uplink data tunnel address carried in the previous step and a list of information on DRB that gNB-CU-CP requests gNB-CU-UP to setup. The information on the PDU session also includes one information element, direct forwarding path availability.

The list of information on DRB includes information on one or more DRBs, which includes a DRB data forwarding request. The DRB data forwarding request list includes information on one or more DRB data forwarding requests on the source base stations. The information on the DRB data forwarding request includes but is not limited to at least one of the following information:

- a radio bearer identifier, for example, which may be the DRB ID of the DRB on the source base station;
- a data forwarding request, indicating that data forwarding is applied to uplink data forwarding, downlink data forwarding, or uplink and downlink data forwarding; or
- a list of information on QoS data flows to be forwarded.

Wherein the list of information on QoS data flows to be forwarded includes but is not limited to at least one of the following information:

- a QoS data flow identifier, for example, which may be a QoS Flow ID; or
- a QoS data flow mapping indication, indicating that the uplink data, downlink data or uplink and downlink data in the data flow are mapped to the current data radio bearer.

At Step 704, the gNB-CU-UP determines that multiple data forwarding tunnel addresses need to be generated for the DRB according to the information, a request for a DRB data forwarding request list, in the information on DRB, and determines that data forwarding is configured as direct forwarding according to the information, direct forwarding path availability.

The gNB-CU-UP sends an E1 message BEARER CONTEXT SETUP RESPONSE to the gNB-CU-CP. The message includes a list of information on PDU sessions which are successfully setup, and the list includes information on one or more PDU sessions. The information on the PDU sessions includes a list of information on DRBs which are successfully setup. The list of information on DRBs includes information on one or more DRBs, and the information on the DRBs includes a DRB data forwarding response list.

The DRB data forwarding response list includes information on one or more DRB data forwarding responses on the source base station. The information on the DRB data forwarding response includes but is not limited to at least one of the following information:

- a radio bearer identifier, for example, which may be the DRB ID of the DRB on the source base station;
- an uplink data forwarding tunnel address; or
- a downlink data forwarding tunnel address.

The tunnel address includes but is not limited to at least one of the following information:

- a transport layer address, for example, IPv4 address or IPv6 address; or
- a Tunnel Endpoint Identifier, for identifying an endpoint of the tunnel.

At Step 705, the gNB-CU-CP sends a message Ng, HANDOVER REQUEST ACKNOWLEDGE, to the AMF. The message includes a list of information on PDU sessions accepted by the gNB-CU-CP, and the list includes information on one or more PDU sessions accepted by the gNB-CU-CP. The information on the PDU session includes a data forwarding response E-RAB list, which includes information on one or more E-RABs for which the gNB-CU-CP accepts data forwarding. The information on the E-RAB includes an E-RAB ID and a data forwarding tunnel address for forwarding downlink data which is corresponding to the E-RAB. The E-RAB here is the DRB on the source base station. The AMF sends a relocation response message to the MME.

At Step 706, the MME sends an S1 message, HANDOVER COMMAND, to the eNB. The message includes a list of information on E-RABs for forwarding data, the information includes an E-RAB ID and a data forwarding tunnel address for forwarding downlink data which is corresponding to the E-RAB.

In this way, the eNB forwards data to the gNB-CU-UP according to the data forwarding tunnel address indicated in step 706. The gNB-CU-UP maps data to corresponding DRBs according to different data forwarding tunnels, so as to ensure that data forwarding can be performed properly. Thus, it is ensured that the user data are not lost and the user experience is not compromised.

The sixth embodiment describes another case that a handover is from the EPS system to the 5G system, the data forwarding from the source base station to the target base station is direct forwarding, and multiple DRBs of the source base station are mapped to one DRB at the target base station.

Figure 8:
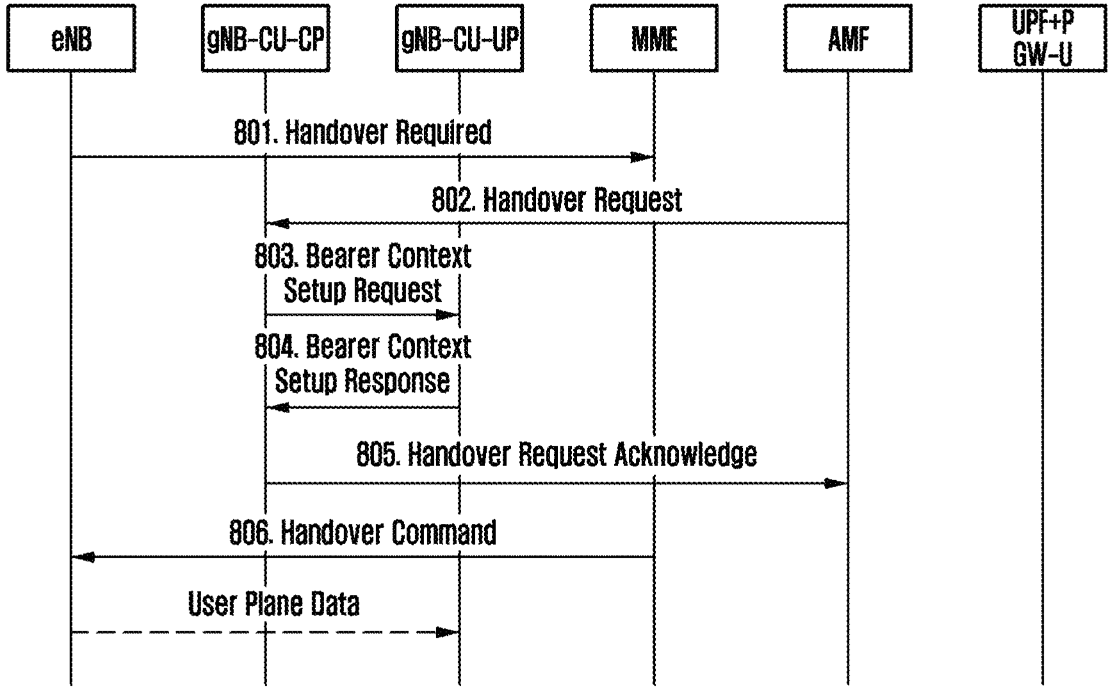
FIG. 8 illustrates a schematic diagram of a sixth embodiment according to the embodiment of the present disclosure.

FIG. 8 illustrates a schematic diagram of the sixth embodiment, which includes the following steps.

At Step 801, an eNB sends an S1 message, Handover Required, to a MME. The message includes information on Handover Type, which indicates that the handover is a handover from the EPS system to the 5G system (EPSto5GS). The MME sends a relocation request message to an AMF.

At Step 802, the AMF sends an Ng message, Handover Request, to the gNB-CU-CP. The handover request message includes the handover type. The handover types may be an intra-5G system (Intra5GS) handover, a handover from the 5GS to the EPS, a handover from the EPS to the 5GS, a handover from the 5GS to the Universal Terrestrial Radio access (UTRA), etc. The message includes data forwarding not possible. The message may also include information direct forwarding path availability. For the handover from the EPS to the 5GS, when data forwarding is possible (for example, the information element, data forwarding not possible, does not exist), absence of the information direct forwarding path availability means that indirect data forwarding is possible.

The message includes a PDU session resource setup list. The PDU session resource setup request transfer included in the information on PDU session resource setup includes a list of QoS flows to be setup. The QoS flow to be setup includes a QoS flow identifier and an identifier of enhanced access bearer (E-RAB) corresponding to the QoS flow.

The message includes a list of E-RAB information. The E-RAB information includes an E-RAB identifier and downlink forwarding, wherein the downlink forwarding refers to the downlink data forwarding for the E-RAB provided by the source base station.

At Step 803, the target CU-CP sends a message to the target base station centralized unit-user plane entity (CU-UP). The message may be a bearer context setup request message. The CU-CP decides the mapping from QoS flow in the PDU session to DRB. The message includes a list of DRBs to be setup. The list of DRBs to be setup includes DRB identifiers and information on the QoS flow(s) mapped to the DRB at the target side. If the source base station requests the downlink data forwarding for an E-RAB, the information on DRBs to be setup includes information on DRB data forwarding information request. The information on DRB data forwarding information request includes a data forwarding request and a list of QoS flows forwarded on the forwarding tunnel. If multiple QoS flows mapped to different E-RABs at the source side are mapped to the same DRB at the target side, a list of the QoS flows includes information on all QoS flows mapped to the DRB. The data forwarding request can be uplink, downlink, or uplink and downlink. For the inter-system handover, data forwarding is downlink.

At Step 804, the target CU-UP sends information on the allocated data forwarding tunnel to the target CU-CP. The message may be a bearer context setup response message or a bearer context modification response message.

The message includes a PDU session resource setup response list. The PDU session resource setup information includes a list of DRBs to be setup. The information on DRBs to be setup includes DRB identifiers. The information on DRBs to be setup may also include information on DRB data forwarding response. The information on DRB data forwarding response includes data forwarding information. The data forwarding information includes a TEID and a transport layer address.

At Step 805, the gNB-CU-CP sends an Ng message, HANDOVER REQUEST ACKNOWLEDGE, to the AMF. The message includes a list of information on PDU sessions accepted by the gNB-CU-CP, and the list includes information on one or more PDU sessions accepted by the gNB-CU-CP. The information on the PDU session includes a data forwarding response E-RAB list, which includes information on one or more E-RABs for which the target base station accepts data forwarding. The information on the E-RAB includes an E-RAB ID and information on the data forwarding tunnel which is corresponding to the E-RAB.

If multiple QoS flows mapped to different E-RABs at the source side are mapped to the same DRB at the target side, the target CU-CP receives the data forwarding tunnel information for the DRB from the target CU-UP. The CU-CP includes the data forwarding tunnel information in the data forwarding response E-RAB information for multiple E-RABs to which the QoS flows mapped to the DRB are mapped at the source side. For example, QoS flow1 is mapped to E-RAB1 at the source side, QoS flow2 is mapped to E-RAB2 at the source side, and QoS flow1 and QoS flow2 are mapped to one DRB at the target side. When the CU-CP receives the data forwarding tunnel information of the DRB from the CU-UP, the CU-CP includes the data forwarding tunnel information of the DRB in the data forwarding responses E-RAB information of E-RAB1 and E-RAB2.

This can solve the problem of how to allocate the data forwarding tunnel per E-RAB at E1 interface. While solving the problem, it can avoid affecting the E1 and NG interface specifications, avoid affecting the CU-UP, support data forwarding in various situations, and reduce data loss. The AMF sends a relocation response message to the MME.

At Step 806, the MIME sends a S1 message, HANDOVER COMMAND, to the eNB. The message includes a list of information on E-RABs requesting for forwarding data, the information includes an E-RAB ID and a data forwarding tunnel address for forwarding downlink data which is corresponding to the E-RAB.

The source base station forwards data to the target CU-UP according to the received data forwarding tunnel information. The source base station forwards the data in the existing way. In the case that multiple QoS flows mapped to different E-RABs at the source side are mapped to the same DRB at the target side, the source base station can send the data of QoS flows mapped to different E-RABs to the storage of the same DRB of the target CU-UP, and the data is sent to the UE through the distributed unit (DU) with the processing of the same DRB.

This can solve the problem of how to allocate the data forwarding tunnel per E-RAB at E1 interface, in the case that multiple QoS flows mapped to different E-RABs at the source side are mapped to the same DRB at the target side.

While solving the problem, it can avoid affecting the E1 and NG interface specifications, avoid affecting the CU-UP, support data forwarding in various situations, and reduce data loss.

So far, the description of the sixth embodiment of the present disclosure has been completed. With this method, data forwarding tunnel information can be correctly assigned and transmitted, which ensures data forwarding to be performed properly, reduces data loss during the handover procedure, improves the handover performance, reduces impact on the eNB, and reduce processing complexity of the CU-CP and the CU-UP.

Figure 9:
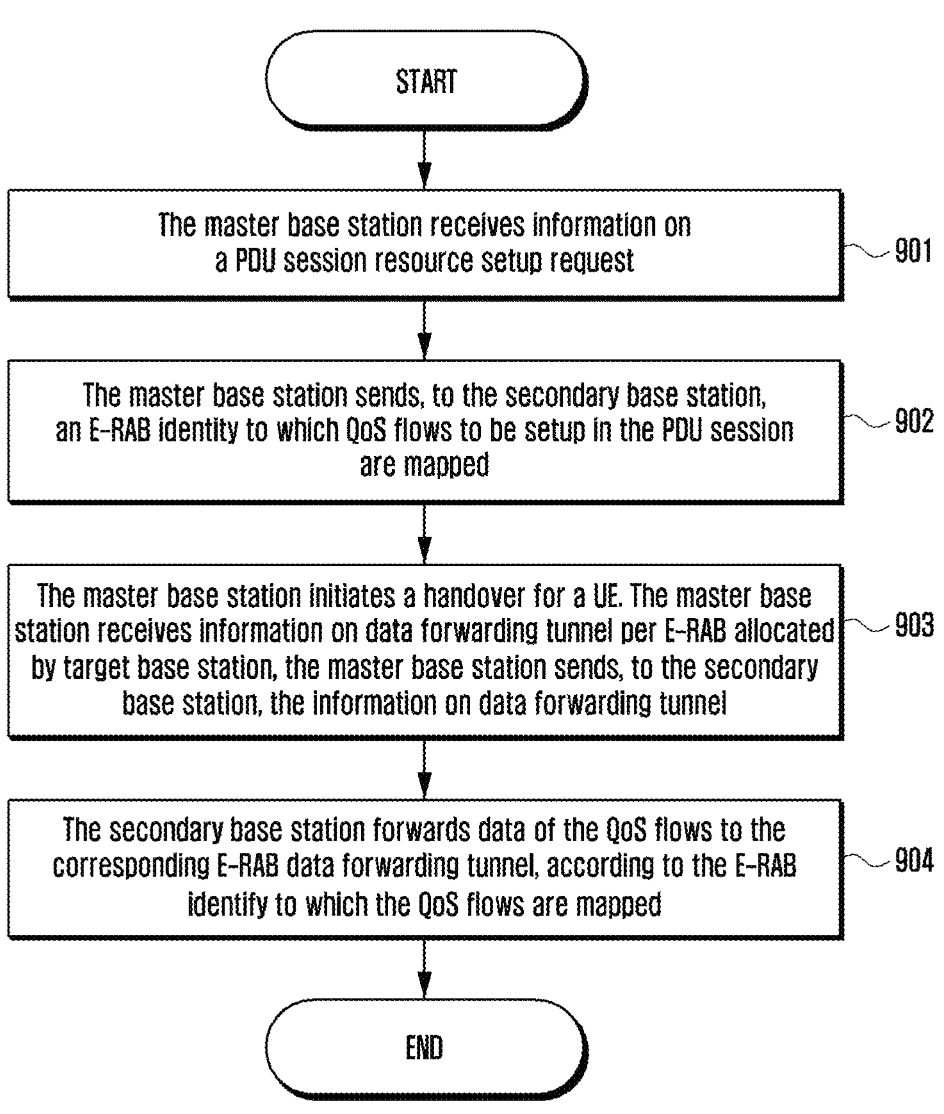
FIG. 9 illustrates a schematic diagram of a seventh embodiment according to the embodiment of the present disclosure.

FIG. 9 illustrates a schematic diagram of the seventh embodiment. In this embodiment, the source mater base station sends at least one of an E-RAB identity corresponding to the QoS flow, a list of QoS flows accepted for data forwarding, data forwarding tunnel information and a handover type to the source secondary base station; and the source secondary base station knows the QoS flow that needs to forward data on the data forwarding tunnel according to at least one of the list of QoS flows accepted for data forwarding and the E-RAB identity corresponding to the QoS flow. According to whether the handover type is the inter-system handover or the handover from the 5G system (5GS) to the evolved packet system (EPS), the source secondary base station knows that it is the inter-system handover, and thus does not include a PDCP SN and QFI information, or does not include a PDCP SN and SDAP header information, in the forwarded PDCP service data unit (SDU) data packet. That the QFI information is not included in the data packet means that the SDAP header information is not included, because only when a QFI exists, other information in the SDAP header needs to exist; the same applies below. The embodiment includes the following steps.

At step 901, the master base station (MN) receives information on protocol data unit PDU session resource setup request. The master base station receives the information on PDU session resource setup request from the core network. The information on the PDU session resource setup request may be received through an initial context setup request message or a PDU session resource setup request message or a handover request message or other messages. The information on the PDU session resource setup request includes at least one of a PDU session identifier and a list of information on the QoS flows to be setup. The information on the QoS flow to be setup includes at least one of a QoS flow identifier (QFI) and an E-RAB identity to which the QoS flow is mapped.

At step 902, the master base station sends, to the secondary base station (SN), the E-RAB identity to which the QoS flow to be setup in the PDU session is mapped. The master base station may send the E-RAB identity to which the QoS flow to be setup is mapped to the SN through a SN addition request or a SN modification request or other messages. The SN save the information on the QoS flow to be setup, including the E-RAB identity to which the QoS flow to be setup is mapped.

In the method of present embodiment, the master base station may send the E-RAB identity to which the QoS flow is mapped the secondary base station during the PDU session resource setup procedure; or include the E-RAB identity to which the QoS flow is mapped when the master base station sends the data forwarding tunnel information and the list of QoS flows accepted for data forwarding to the secondary base station during the handover procedure (step 903); and the master base station may include the QoS flow identifier and the E-RAB identity corresponding to the QoS flow in the information on the QoS flows accepted for data forwarding. Corresponding to the method that the master base station sends the E-RAB identity to which the QoS flow is mapped to the secondary base station in the handover procedure, step 902 is not necessary.

At step 903, the master base station initiates a handover for the UE. The master base station receives the data forwarding tunnel information. For direct data forwarding, the data forwarding tunnel information is information on the data forwarding tunnel per E-RAB allocated by the target base station. The master base station receives a list of information on QoS flows accepted for data forwarding, and the information on the QoS flow accepted for data forwarding includes a QoS flow identifier. The master base station sends the data forwarding tunnel information and the list of information on QoS flows accepted for data forwarding to SN. The information on the QoS flow includes the QoS flow identifier. The information on the QoS flow may also include the E-RAB identity to which the QoS flow is mapped, and the master base station may include the QoS flow identifier and the E-RAB identity corresponding to the QoS flow in the information on the QoS flow accepted for data forwarding.

The master base station sends the handover type to the SN. The handover type may be an inter-system handover or an intra-system handover, or a handover from the 5GS to the EPS or intra-system (5GS) handover. When it is direct data forwarding between the master base station and the target base station and/or between the secondary base station and the target base station, the master base station sends the handover type to the SN. If the direct data forwarding path between the SN and the target base station is available, the master base station sends, to the SN, the received data forwarding tunnel information, the E-RAB identity corresponding to the QoS flow, and/or the handover type. If the direct data forwarding path between the SN and the target base station is unavailable, the master base station allocates the information for the data forwarding tunnel between the master base station and the SN, and sends the information on the data forwarding tunnel allocated by the master base station to the SN.

At step 904, the SN forwards the data to the corresponding data forwarding tunnel. Corresponding to the bearer terminated at the SN, the SN directly forwards the data to the target base station. If the direct data forwarding path between the SN and the target base station is available, the SN directly forwards the data to the target base station. According to the E-RAB identity to which the QoS flow is mapped, the SN knows the data of each QoS flow needs to be forwarded on which E-RAB tunnel, so as to send the data of the QoS flow to the corresponding E-RAB tunnel. For the inter-system handover, the SN does not include the PDCP SN and the QFI information, or does not include the PDCP SN and the SDAP header information, in the forwarded data packet. According to the reception of the handover type or the reception of the E-RAB identity corresponding to the QoS flow accepted for data forwarding, the SN knows that it is an inter-system handover. This data transmission method is suitable for the way that the SN directly forwards data to the target base station or the way that SN forwards data to the target base station through the master base station.

If the direct data forwarding path between the SN and the target base station is unavailable, the SN forwards data to the target base station through the master base station.

As for the data forwarding method that the SN forwards data to the master base station, and then the data is forwarded to the target base station by the master base station, another implementation of the present disclosure is that: the SN does not distinguish between the intra-system handover and the inter-system handover; the SN forwards data to the master base station; the data packet may include the PDCP SN and the QFI information or the PDCP SN and the SDAP header information; the master base station knows that it is the inter-system handover; after receiving data forwarded from the SN, the master base station removes the PDCP SN and the QFI information or the PDCP SN and the SDAP header information from the data packet; and then sends the data packet to the target base station. Corresponding to this data forwarding method, when the direct forwarding path between the SN and the target base station is unavailable, the master base station does not need to send the handover type to the S-SN.

So far, the description of the seventh embodiment of the present disclosure has been completed. With this method, direct data forwarding from the SN to the target base station during the procedure of a handover from the MR-DC to the EPC can be supported, and data can be correctly forwarded to the corresponding data forwarding tunnel, which ensures that the data forwarding is performed properly, reduces data loss during the handover procedure and improves the handover performance.

Figure 10:
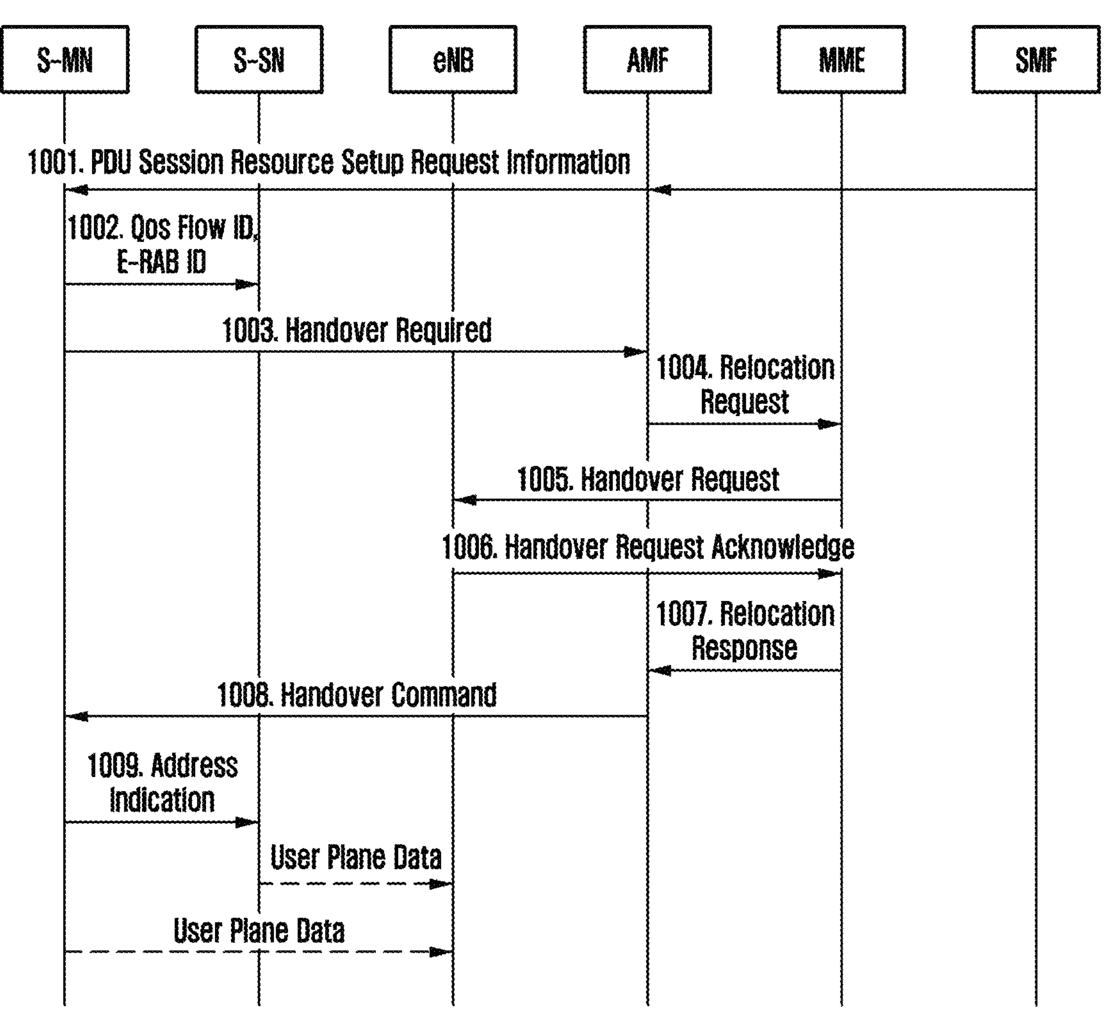
FIG. 10 illustrates a schematic diagram of an eighth embodiment according to the embodiment of the present disclosure.

FIG. 10 illustrates a schematic diagram of the eighth embodiment. In this embodiment, the source mater base station (S-MN) sends at least one of the E-RAB identity corresponding to the QoS flow, the list of QoS flows accepted for data forwarding, data forwarding tunnel information and a handover type to the source secondary base station; and the source secondary base station knows the QoS flow that needs to forward data on the data forwarding tunnel according to at least one of the list of QoS flows accepted for data forwarding and the E-RAB identity corresponding to the QoS flow. According to whether the handover type is the inter-system handover or the handover from the 5G system (5GS) to the evolved packet system (EPS), the source secondary base station knows that it is the inter-system handover, and thus does not include a PDCP SN and QFI information, or does not include a PDCP SN and SDAP header information, in the forwarded PDCP SDU data packet. The description of steps irrelevant to the disclosure is omitted here. This embodiment includes the following steps.

At Step 1001, the master base station receives the information on protocol data unit PDU session resource setup request. The master base station receives the information on PDU session resource setup request from the core network. The information on PDU session resource setup request may be received through an initial context setup request message or a PDU session resource setup request message or a handover request message or other messages. The information on the PDU session resource setup request is received from the message sent by an AMF. The information is transparently transmitted by the SMF to the master base station through the AMF. The information on PDU session resource setup request includes a PDU session identifier and a list of information on the QoS flows to be setup. The information on the QoS flow to be setup includes a QoS flow identifier (QFI) and an E-RAB identity to which the QoS flow is mapped. In the figure, the master base station is described as the source master base station (S-MN), in order to illustrate that the master base station performs the function of the source master base station for the UE with respect to the subsequent handover procedure.

At Step 1002, the master base station sends the E-RAB identity to which the QoS flow to be setup in the PDU session is mapped to the secondary base station SN. In the figure, the secondary base station is described as the source secondary base station (S-SN), in order to illustrate that the secondary base station performs the function of the source secondary base station for the UE with respect to the subsequent handover procedure. The master base station may send the E-RAB identity to which the QoS flow to be setup is mapped, to the SN through a SN addition request or a SN modification request or other messages. The SN save the information on the QoS flows to be setup, including the E-RAB identity to which the QoS flow to be setup is mapped.

In the method of present embodiment, the master base station may send the E-RAB identity to which the QoS flow is mapped the secondary base station during the PDU session resource setup procedure; or may include the E-RAB identity to which the QoS flow is mapped when the master base station sends the data forwarding tunnel information and a list of QoS flows accepted for data forwarding to the secondary base station during the handover procedure (step 1009). The master base station can include the QoS flow identifier and the E-RAB identity corresponding to the QoS flow in the information on the QoS flows accepted for data forwarding. Corresponding to the method that the master base station sends the E-RAB identity to which the QoS flow is mapped to the secondary base station in the handover procedure, step 1002 is not necessary.

At step 1003, the S-MN initiates a handover for the UE. The S-MN sends a handover required message to the AMF. The message includes the identifier of the S-SN. The identifier of the S-SN may be included in a source-to-target transparent container in the handover required message.

At Step 1004, the AMF sends a relocation request message to the MME.

At Step 1005, the MME sends a handover request message to the target base station eNB.

At Step 1006, for the E-RAB accepted for downlink data forwarding, the eNB allocates the information on downlink data forwarding tunnel. The information on the downlink data forwarding tunnel is per E-RAB. The information on the downlink data forwarding tunnel includes a transport layer address and a tunnel endpoint identifier (e.g., a TEID). If the eNB receives the identifier of the S-SN, the eNB determines whether the direct forwarding path between the eNB and the S-SN is available.

The eNB sends a handover request acknowledge message to the MME. The message includes the information on the data forwarding tunnel allocated by the eNB for downlink data forwarding. The message includes information that the direct forwarding path between the eNB and the S-SN is available. The information that the direct forwarding path between the eNB and the S-SN is available can be included in a target-to-source transparent container.

At step 1007, the MME sends a relocation response message to the AMF. The message includes the data forwarding tunnel information. For direct data forwarding, the data forwarding tunnel information includes the information on the data forwarding tunnel allocated by the eNB for downlink data forwarding. For indirect data forwarding, the MME requests the SGW to allocate the information on the data forwarding tunnel used between the UPF and the SGW, wherein the information on the data forwarding tunnel includes the data forwarding tunnel information used between the UPF and the SGW which is allocated by the SGW.

At step 1008, the AMF sends a handover command message to the S-MN. The message includes the data forwarding tunnel information and a list of information on QoS flows accepted for data forwarding. For direct data forwarding, the data forwarding tunnel information is information on the data forwarding tunnel for downlink data forwarding received by the AMF from the MME, and the information on the data forwarding tunnel for downlink data forwarding is allocated by the target eNB. For indirect data forwarding, the information on the tunnel is information on the data forwarding tunnel for forwarding data from the source base station to the UPF allocated by the SMF or the UPF.

At step 1009, the S-MN receives the data forwarding tunnel information. For direct data forwarding, the data forwarding tunnel information is information on the data forwarding tunnel per E-RAB allocated by the target base station. For indirect data forwarding, the information on the tunnel is information on the data forwarding tunnel for forwarding data from the source base station to the UPF allocated by the SMF or the UPF. The S-MN receives the list of information on QoS flows accepted for data forwarding, and the information on QoS flows accepted for data forwarding includes QoS flow identifiers.

For a bearer terminated at the S-MN, the S-MN forwards data. For direct data forwarding, the S-MN forwards the data of the QoS flow to the corresponding E-RAB data forwarding tunnel according to the E-RAB identity to which the QoS flow is mapped. For indirect data forwarding, the S-MN forwards data according to the received data forwarding tunnel information, for example, the S-MN forwards data according to the received PDU session data forwarding tunnel or DRB data forwarding tunnel.

For a bearer terminated at the S-SN, the master base station sends the data forwarding tunnel information and the list of information on QoS flows accepted for data forwarding to the SN. The information on the QoS flow includes a QoS flow identifier. The information on the QoS flow may also include the E-RAB identity to which the QoS flow is mapped, and the master base station may include the QoS flow identifier and the E-RAB identity corresponding to the QoS flow in the information on QoS flows accepted for data forwarding. The master base station may also send the handover type to the S-SN, and the specific information on the handover type is the same as that in step 903, and will not be repeated here.

When it is direct data forwarding between the master base station and the target base station and/or between the secondary base station and the target base station, the master base station sends the handover type to the SN. If the direct data forwarding path between the S-SN and the eNB is available, the S-MN sends, to the S-SN, the received data forwarding tunnel information, the E-RAB identity corresponding to the QoS flow, and/or the handover type. The S-MN knows whether the direct data forwarding path between the S-SN and the eNB is available according to the operation and maintenance (O & M) configuration; or if S-MN receives the information on the direct data forwarding path between the eNB and the S-SN availability, the direct data forwarding path between the S-SN and the eNB is available; the S-MN can also know whether the direct data forwarding path between the S-SN and the eNB is available according to other ways without affecting the main content of the present disclosure.

The S-SN directly forwards data to the eNB. The S-SN forwards the data of QoS flow to the corresponding E-RAB data forwarding tunnel. According to the E-RAB identity to which the QoS flow is mapped, the SN knows the data of each QoS flow needs to be forwarded on which E-RAB tunnel, so as to send the data of the QoS flow to the corresponding E-RAB tunnel. For the inter-system handover, the SN does not include the PDCP SN and the QFI information or does not include the PDCP SN and the SDAP header information, in the forwarded data packet.

According to reception of the handover type or reception of the E-RAB identity corresponding to the QoS flow accepted for data forwarding, the SN knows that it is the inter-system handover. The data transmission method is suitable for the way that the S-SN directly forwards data to the target base station or the way that the S-SN forwards data to the target base station through the S-MN.

As for the data forwarding method that the S-SN forwards data to the S-MN and then the data are forwarded to the eNB by the S-MN, another implementation of the present disclosure is that: the S-SN does not distinguish between the intra-system handover and the inter-system handover; the S-SN forwards data to the S-MN; the data packet may include the PDCP SN and the QFI information or the PDCP SN and the SDAP header information; the S-MN knows that it is the inter-system handover; after receiving the data forwarded from the S-SN, the S-MN removes the PDCP SN and the QFI information or the PDCP SN and the SDAP header information from the data packet, and then sends the data packet to the target base station. Corresponding to this data forwarding method, when the direct forwarding path between the S-SN and the target base station is unavailable, the S-MN does not need to send the handover type to the S-SN.

If the direct data forwarding path between the S-SN and the eNB is unavailable, the S-MN allocates a data forwarding tunnel used between the S-MN and S-SN, and the S-MN sends information on the data forwarding tunnel allocated by the S-MN to the S-SN. The S-SN forwards data to the S-MN, and the data is forwarded to the eNB through the S-MN.

So far, the description of the eighth embodiment of the present disclosure has been completed. With this method, the direct data forwarding from the SN to the target base station during the procedure of the handover from the MR-DC to the EPC can be supported, and data can be correctly forwarded to the corresponding data forwarding tunnel, which ensures that the data forwarding is performed properly, reduces data loss during the handover procedure and improves the handover performance.

Figure 11:
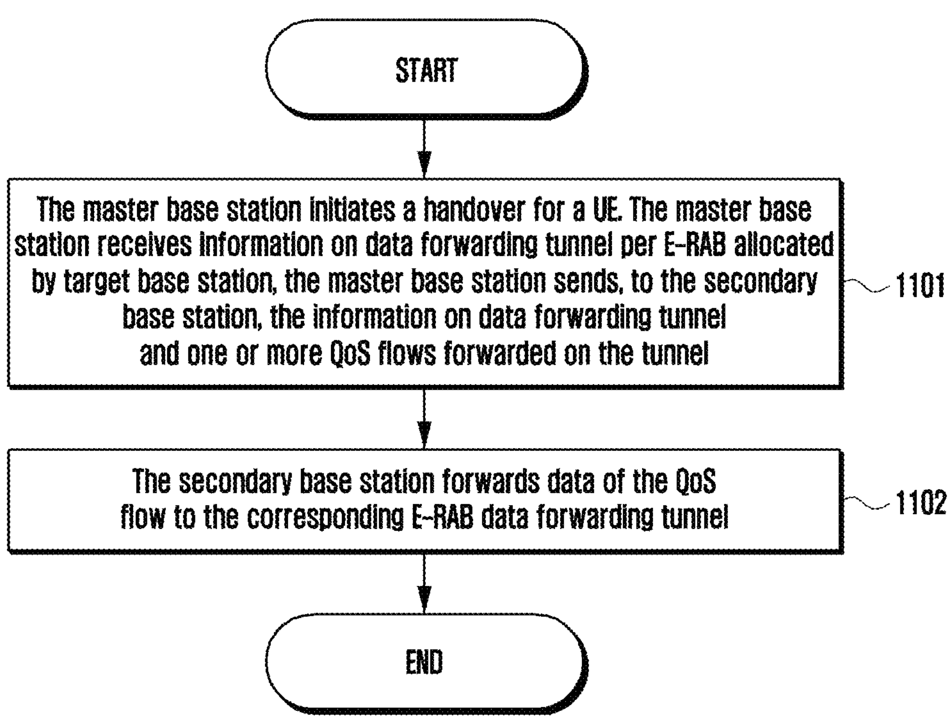
FIG. 11 illustrates a schematic diagram of a ninth embodiment according to the embodiment of the present disclosure

FIG. 11 illustrates a schematic diagram of the ninth embodiment. In this embodiment, the source master base station knows one or more QoS flows that need to forward data on each data forwarding tunnel according to a list of QoS flows accepted for data forwarding and the E-RAB identity corresponding to the QoS flow; and the source master base station sends data forwarding tunnel information and one or more QoS flows that need to be forwarded on the data forwarding tunnel to the secondary base station. This embodiment includes the following steps.

At Step 1101, the master base station initiates a handover for the UE.

The master base station receives the data forwarding tunnel information. For direct data forwarding, the data forwarding tunnel information is information on the data forwarding tunnel per E-RAB allocated by the target base station. The master base station receives a list of information on QoS flows accepted for data forwarding, and the information on the QoS flow accepted for data forwarding includes a QoS flow identifier. The master base station can receive the data forwarding tunnel information and the list of information on QoS flows accepted for data forwarding from the core network through the handover command message or other messages.

The master base station sends the data forwarding tunnel information and one or more QoS flows forwarded on the tunnel to the SN. The master base station can also send the handover type to the SN, and the specific information on the handover type is the same as that in step 903, and will not be repeated here. When it is direct data forwarding between the master base station and the target base station and/or between the secondary base station and the target base station, the master base station sends the handover type to the SN.

During the PDU session setup procedure, the master base station receives the E-RAB identity corresponding to the QoS flows to be setup from the core network, and the specific method is the same as that in step 901, and will not be repeated here. The master base station knows one or more QoS flows that need to forward data on the data forwarding tunnel of each E-RAB according to the list of QoS flows accepted for data forwarding and the E-RAB identity corresponding to each QoS flow.

If the direct data forwarding path between the SN and the target base station is available, the master base station sends the received data forwarding tunnel information to the SN. If the direct data forwarding path between the SN and the target base station is unavailable, the master base station allocates information on the data forwarding tunnel used between the master base station and the SN, and sends the information on the data forwarding tunnel allocated by the master base station to the SN.

At step 1102, the SN forwards the data to the corresponding data forwarding tunnel. For a bearer terminated at the SN, if the direct data forwarding path between the SN and the target base station is available, the SN directly forwards the data to the target base station. According to the information received from the master base station in step 1101, the SN knows the data of each QoS flow needs to be forwarded on which E-RAB tunnel, so as to send the data of the QoS flow to the corresponding E-RAB channel. If the direct data forwarding path between the SN and the target base station is unavailable, the SN forwards the data to the target base station through the master base station. For the inter-system handover, the SN does not include the PDCP SN and the QFI information, or does not include the PDCP SN and the SDAP header information, in the forwarded data packet. According to reception of the handover type, the SN knows that the handover is the inter-system handover; or according to reception of the information on one or more QoS flows that need to forward data on the data forwarding tunnel, the SN knows that the handover is the inter-system handover. The data transmission method is suitable for the way that the SN directly forwards data to the target base station or the way that the SN forwards data to the target base station through the master base station.

As for the data forwarding method that the SN forwards data to the master base station, and then the data is forwarded to the target base station by the master base station, another implementation of the present disclosure is that: the SN does not distinguish between the intra-system handover and the inter-system handover; the SN forwards data to the master base station, the data packet may include the PDCP SN and the QFI information or the PDCP SN and the SDAP header information; the master base station knows that it is the inter-system handover; after receiving the data forwarded from the SN, the master base station removes the PDCP SN and the QFI information or the PDCP SN and the SDAP header information from the data packet, and then sends the data packet to the target base station. Corresponding to this data forwarding method, when the direct forwarding path between the SN and the target base station is unavailable, the master base station does not need to send the handover type to the S-SN.

So far, the description of the ninth embodiment of the present disclosure has been completed. With this method, the direct data forwarding from the SN to the target base station during the procedure of the handover from the MR-DC to the EPC can be supported, and data can be correctly forwarded to the corresponding data forwarding tunnel, which ensures that the data forwarding is performed properly, reduces data loss during the handover procedure and improves the handover performance.

Figure 12:
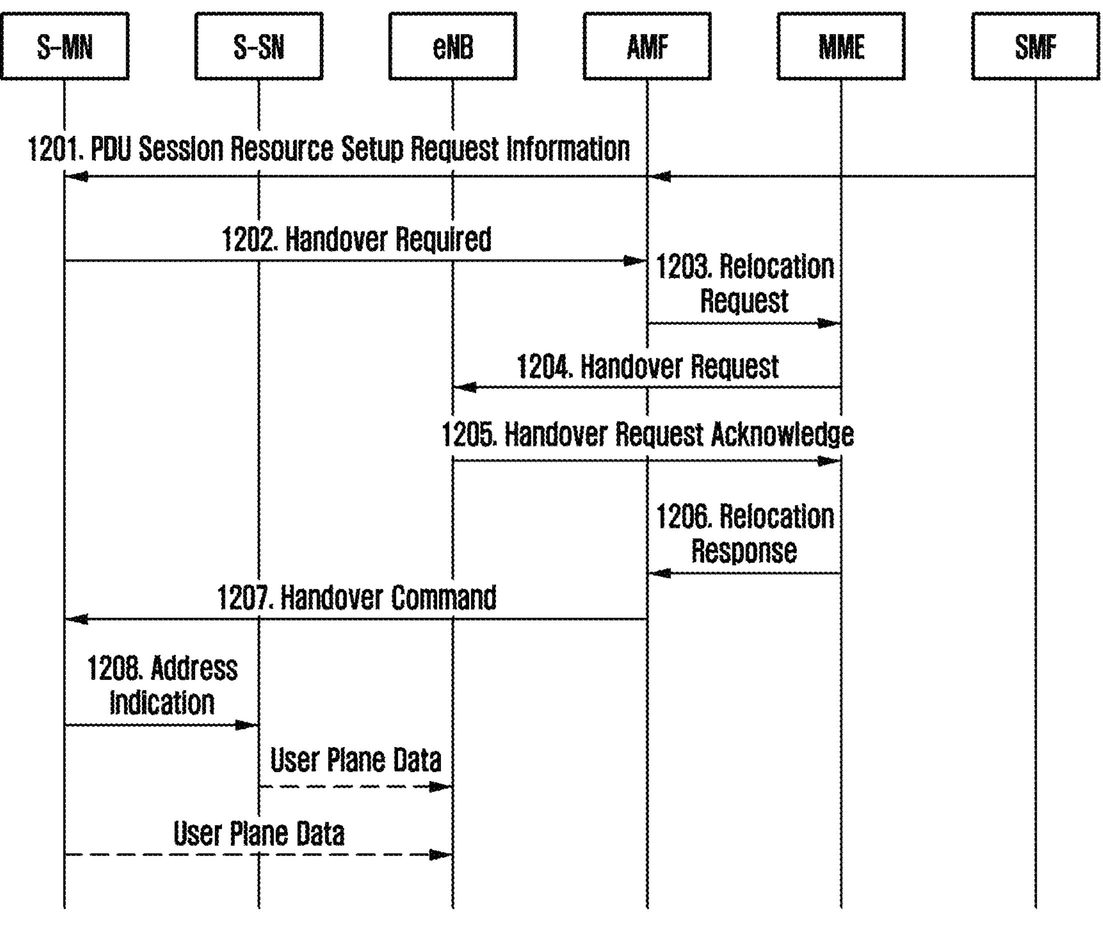
FIG. 12 illustrates a schematic diagram of a tenth embodiment according to the embodiment of the present disclosure.

FIG. 12 illustrates a schematic diagram of the tenth embodiment. In this embodiment, the source master base station knows one or more QoS flows that need to forward data on each data forwarding tunnel according to a list of QoS flows accepted for data forwarding and the identifier of a E-RAB corresponding to the QoS flow; and the source master base station sends data forwarding tunnel information and one or more QoS flows that need to be forwarded on the data forwarding tunnel to the secondary base station. The description of steps irrelevant to the disclosure is omitted here. This embodiment includes the following steps.

Step 1201 is the same as step 1001, and will not be repeated here.

Steps 1202 to 1207 are the same as steps 1003 to 1008, and will not be repeated here.

At step 1208, the S-MN receives the data forwarding tunnel information. For direct data forwarding, the data forwarding tunnel information is information on the data forwarding tunnel per E-RAB allocated by the target base station. For indirect data forwarding, the information on the tunnel is information on the data forwarding tunnel for forwarding data from the source base station to the UPF allocated by the SMF or the UPF. The S-MN receives a list of information on QoS flows accepted for data forwarding, and the information on the QoS flow accepted for data forwarding includes a QoS flow identifier. The S-MN can receive the data forwarding tunnel information and the list of the information on the QoS flows accepted for data forwarding from the core network through the handover command message of step 1207.

For a bearer terminated at the S-MN, the S-MN forwards data. For direct data forwarding, the S-MN forwards the data of the QoS flow to the corresponding E-RAB data forwarding tunnel according to the E-RAB identity to which the QoS flow is mapped. For indirect data forwarding, the S-MN forwards data according to the received data forwarding tunnel information, for example, the S-MN forwards data according to the received PDU session data forwarding tunnel or DRB data forwarding tunnel.

For a bearer terminated at the S-SN, the S-MN sends the data forwarding tunnel information and the information on one or more QoS flows forwarded on the tunnel to the SN. The information on the QoS flow forwarded on the tunnel includes the QoS flow identifier. The S-MN sends the received data forwarding tunnel information to the S-SN if the direct data forwarding path between the S-SN and the eNB is available. The S-MN knows whether the direct data forwarding path between the S-SN and the eNB is available according to the operation and maintenance (O & M) configuration; or if the S-MN receives information that the direct data forwarding path between the eNB and the S-SN is available, the direct data forwarding path between the S-SN and the eNB is available; the S-MN can also know whether the direct data forwarding path between the S-SN and the eNB is available according to other ways without affecting the main content of the present disclosure.

The S-SN directly forwards data to the eNB. The S-SN forwards the data of QoS flow to the corresponding E-RAB data forwarding tunnel. According to the list of QoS flows accepted for data forwarding and the E-RAB identity corresponding to each QoS flow, the S-MN knows the one or more QoS flow needs to forward data on the data forwarding tunnel per E-RAB, so as to send the data forwarding tunnel information and one or more QoS flows forwarded on the tunnel to the S-SN. The S-MN can also send the handover type to the S-SN, and the specific information on the handover type is the same as that in step 903, and will not be repeated here. When it is direct data forwarding between the master base station and the target base station and/or between the secondary base station and the target base station, the master base station sends the handover type to the SN.

If the direct data forwarding path between the S-SN and the eNB is unavailable, the S-MN allocates a data forwarding tunnel used between the S-MN and the S-SN, and the S-MN sends the information on the data forwarding tunnel allocated by the S-MN to the S-SN. The S-SN forwards data to the S-MN, and the data are forwarded to the eNB through the S-MN.

For the inter-system handover, the SN does not include the PDCP SN and the QFI information or the PDCP SN and the SDAP header information in the forwarded data packet. According to reception of the handover type, the SN knows that the handover is the inter-system handover; or according to reception of the information on one or more QoS flows that need to forward data on the data forwarding tunnel, the SN indirectly knows that the handover is the inter-system handover. The data transmission method is suitable for the way that the S-SN directly forwards data to the target base station or the way that the S-SN forwards data to the target base station through the S-MN.

As for the data forwarding method that the S-SN forwards data to the S-MN and then the data is forwarded to the eNB by the S-MN, another implementation of the present disclosure is that: the S-SN does not distinguish between the intra-system handover and the inter-system handover; the S-SN forwards data to the S-MN; the data packet may include the PDCP SN and the QFI information or the PDCP SN and the SDAP header information; the S-MN knows that it is the inter-system handover; after receiving the data forwarded from the S-SN, the S-MN removes the PDCP SN and the QFI information the PDCP SN and the SDAP header information from the data packet, and then sends the data packet to the target base station. Corresponding to the data forwarding method, when the direct forwarding path between the S-SN and the target base station is unavailable, the S-MN does not need to send the handover type to the S-SN.

So far, the description of the tenth embodiment of the present disclosure has been completed. With this method, the direct data forwarding from the SN to the target base station during the procedure of the handover from the MR-DC to the EPC can be supported, and data can be correctly forwarded to the corresponding data forwarding tunnel, which ensures that the data forwarding is performed properly, reduces data loss during the handover procedure and improves the handover performance.

Figure 13:
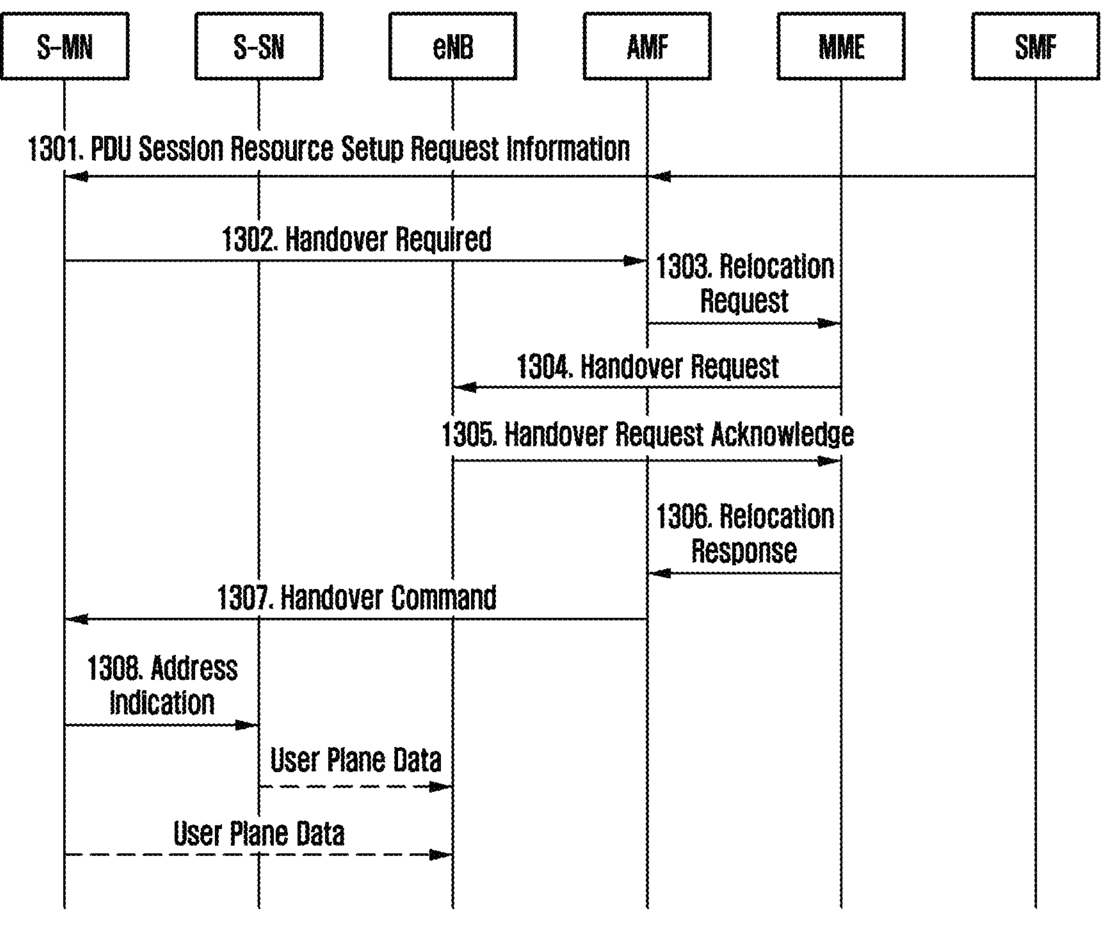
FIG. 13 illustrates a schematic diagram of an eleventh embodiment according to the embodiment of the present disclosure.

FIG. 13 illustrates a schematic diagram of the eleventh embodiment. In this embodiment, the source master base station knows one or more QoS flows that need to forward data on each data forwarding tunnel according to a list of QoS flows accepted for data forwarding and the mapped E-RAB identity of a QoS flow; and the source master base station sends information on data forwarding from target E-UTRAN to the source SN(S-SN). The description of steps irrelevant to the disclosure is omitted here. This embodiment includes the following steps.

Step 1301 is the same as step 1001, and will not be repeated here.

Steps 1302 to 1307 are the same as steps 1003 to 1008, and will not be repeated here.

At step 1308, the S-MN receives the data forwarding tunnel information. For direct data forwarding, the data forwarding tunnel information is information on the data forwarding tunnel per E-RAB allocated by the target base station. For indirect data forwarding, the information on the tunnel is information on the data forwarding tunnel for forwarding data from the source base station to the UPF allocated by the SMF or the UPF. The data forwarding tunnel information includes a transport layer address and a tunnel end identifier (TED). The S-MN receives a list of information on QoS flows accepted for data forwarding, and the information on the QoS flow accepted for data forwarding includes a QoS flow identifier. The S-MN can receive the data forwarding tunnel information and the list of information on the QoS flows accepted for data forwarding from the core network through the handover command message of step 1307.

For a bearer terminated at the S-MN, the S-MN forwards data. For direct data forwarding, the S-MN forwards the data of the QoS flow to the corresponding E-RAB data forwarding tunnel according to the E-RAB identity to which the QoS flow is mapped. For indirect data forwarding, the S-MN forwards data according to the received data forwarding tunnel information, for example, the S-MN forwards data according to the received PDU session data forwarding tunnel or DRB data forwarding tunnel.

For a bearer terminated at the S-SN, the S-MN sends information on data forwarding from the target E-UTRAN to the source SN(S-SN). There may be one or more piece of the information on data forwarding from the target E-UTRAN. The information on data forwarding from the target E-UTRAN includes the data forwarding tunnel information and information on one or more QoS flows to be forwarded on the tunnel. The information on the QoS flow to be forwarded on the tunnel includes a QoS flow identifier. The information on data forwarding from the target E-UTRAN may also contain a DRB identifier or an E-RAB identifier. The DRB identifier is the E-RAB identifier of the target system, and the DRB identifier is used to represent the E-RAB identifier, that is, the E-RAB identity corresponding to the QoS flow. The data forwarding tunnel information is downlink data forwarding tunnel information. The data forwarding tunnel information includes a transport layer address and a TEID.

The S-MN sends the received the data forwarding tunnel information to the S-SN if the direct data forwarding path between the S-SN and the eNB is available. The S-MN knows whether the direct data forwarding path between the S-SN and the eNB is available according to the operation and maintenance (O & M) configuration; or if the S-MN receives information that the direct data forwarding path between the eNB and the S-SN is available, the direct data forwarding path between the S-SN and the eNB is available;

the S-MN can also know whether the direct data forwarding path between the S-SN and the eNB is available according to other ways without affecting the main content of the present disclosure.

According to the list of QoS flows accepted for data forwarding and the E-RAB identity corresponding to each QoS flow, the S-MN knows the one or more QoS flows that need to be forwarded data on the data forwarding tunnel per E-RAB, so as to send the data forwarding tunnel information, one or more QoS flows to be forwarded on the tunnel, and/or the E-RAB identifier or the DRB identifier to the S-SN. The S-SN directly forwards data to the eNB. The S-SN forwards data of a QoS flow to the corresponding E-RAB data forwarding tunnel.

If the direct data forwarding path between the S-SN and the eNB is unavailable, the S-MN allocates a data forwarding tunnel used between the S-MN and the S-SN, and the S-MN sends the information on the data forwarding tunnel allocated by the S-MN to the S-SN. The S-SN forwards data to the S-MN, and the data are forwarded to the eNB through the S-MN.

For the inter-system handover, the S-SN does not include PDCP SN and QFI information or PDCP SN and SDAP header information in the forwarded data packet. According to reception of the information on data forwarding from the target E-UTRAN, the SN knows that it is the inter-system handover. The information included in the information on data forwarding from the target E-UTRAN is the same as that described above, and will not be repeated here. This data transmission method is suitable for the way that the S-SN directly forwards data to the target base station or the way that the S-SN forwards data to the target base station through the S-MN.

As for the data forwarding method that the S-SN forwards data to the S-MN and then the data are forwarded to the eNB by the S-MN, another implementation of the present disclosure is that: the S-SN does not distinguish between the intra-system handover and the inter-system handover; the S-SN forwards data to the S-MN; the data packet may include the PDCP SN and the QFI information or the PDCP SN and the SDAP header information; the S-MN knows that it is the inter-system handover; after receiving the data forwarded from the S-SN, the S-MN removes the PDCP SN and the QFI information or the PDCP SN and the SDAP header information from the data packet, and then sends the data packet to the target base station.

So far, the description of the eleventh embodiment of the present disclosure has been completed. With this method, direct data forwarding from the SN to the target base station during the procedure of the handover from the MR-DC to the EPC can be supported, and data can be correctly forwarded to the corresponding data forwarding tunnel, which ensures that the data forwarding is performed properly, reduces data loss during the handover procedure and improves the handover performance.

Figure 14:
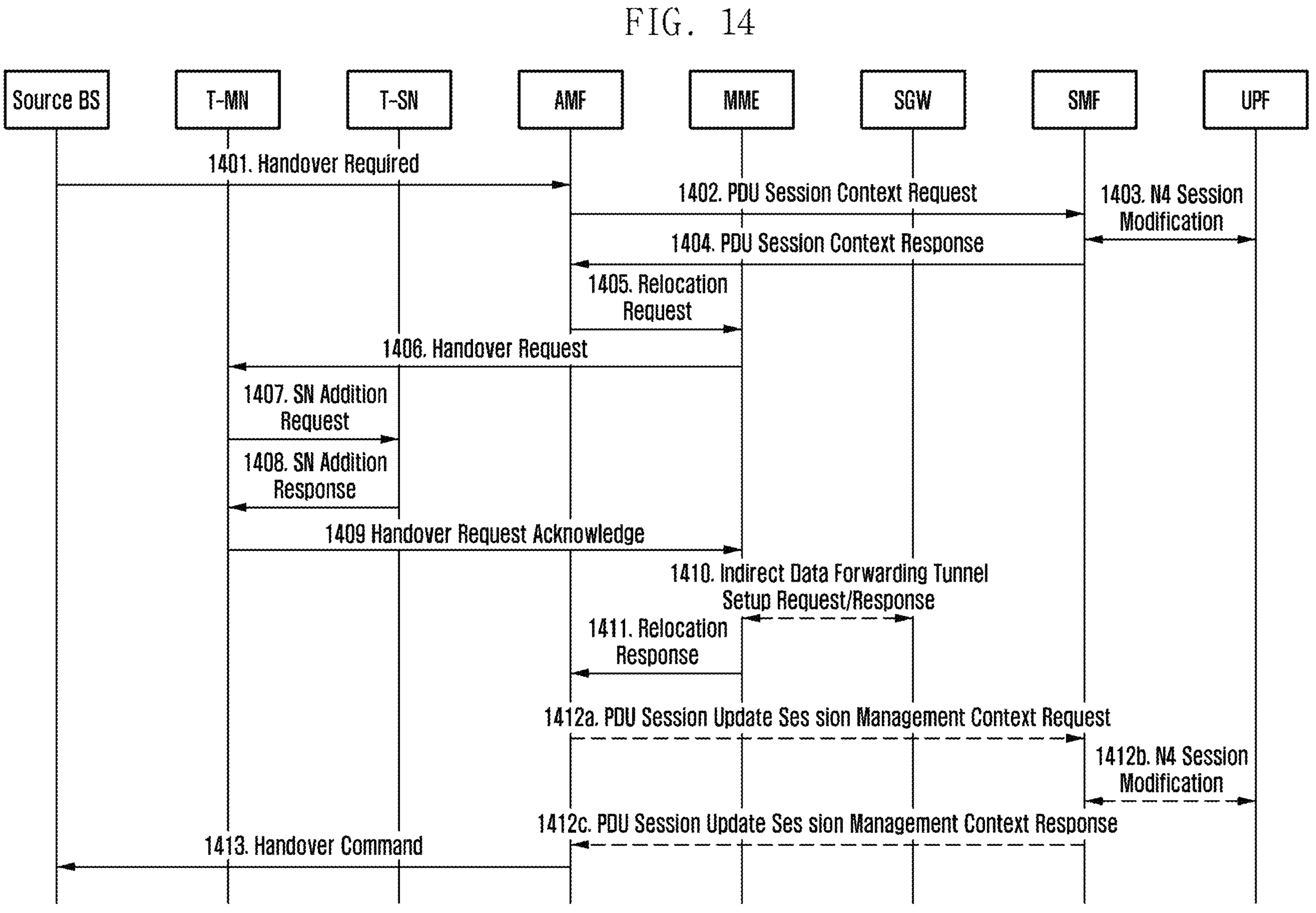
FIG. 14 illustrates a schematic diagram of a twelfth embodiment according to the embodiment of the present disclosure.

FIG. 14 illustrates a schematic diagram of the twelfth embodiment. This embodiment is illustrated by taking the handover from the 5G to the EN-DC as an example, and it is also applicable to other inter-system handover or intra-system handover situations. The description of steps irrelevant to the disclosure is omitted here. This embodiment includes the following steps.

At step 1401, the source base station sends a handover required message to the access and mobility management entity. The access and mobility management entity is an access and mobility management entity serving the UE at the source base station, also known as the source access and mobility management entity. The access and mobility management entity in the 5G system is the AMF. If the direct forwarding path between the source base station and the target base station is available, the handover required message includes the information on the direct forwarding path availability. The target base station is the target master base station. The message includes identification information on the source base station. The identification information on the source base station may be included in a source-to-target transparent container. The message includes information on evolved radio access bearer (E-RAB) provided for data forwarding by the source base station. The information on the E-RAB provided for data forwarding by the source base station can be included in the source-to-target transparent container.

At step 1402, the access and mobility management entity sends a PDU session context request message to the session management entity. The session management entity in the 5G system is the SMF. The SMF also has the function of the PGW control plane. If the AMF receives the information on the direct forwarding path availability, the PDU session context request message includes the information on the direct forwarding path availability.

At step 1403, the session management entity initiates a session modification procedure with the user plane entity. The user plane entity in the 5G system is the UPF. The UPF also has the function of the PGW user plane.

At Step 1404, the session management entity sends a PDU session context response message to the access and mobility management entity.

At step 1405, the source access and mobility management entity sends a relocation request message to the target mobility management entity. The mobility management entity in the 4G system is the MME. The message includes direct forwarding indication or the information on the direct forwarding path availability.

At step 1406, the target mobility management entity sends a handover request message to the target base station. The target base station is the target master base station. The message includes an identifier of the source base station.

At step 1407, the target base station decides whether to add a secondary base station. If it is decided to add a secondary base station, the target master base station sends a secondary base station addition request message to the secondary base station. The message includes the identifier of the source base station. For a bearer terminated at the secondary base station, the message includes information on downlink data forwarding. The secondary base station can also be said as the target secondary base station. The bearer can be an E-RAB, or an EPS bearer, or a data radio bearer, or other bearers; the same applies below.

The secondary base station determines whether that direct forward path between the source base station and the secondary base station is available.

At step 1408, the secondary base station sends a secondary base station addition response message to the target master base station. The message includes direct forwarding path availability, the direct forwarding path availability means the direct forwarding path between the secondary base station and the source base station is available. For the bearer terminated at the secondary base station which is accepted to be setup by the secondary base station, and for the bearer for which the downlink data forwarding is accepted by the secondary base station, the message includes the information on the data forwarding tunnel allocated by the secondary base station.

At step 1409, the target master base station sends a handover request acknowledge message to the target mobility management entity. The message includes that the direct forwarding path availability, which means that a direct forwarding path between the secondary base station and the source base station is available. For the bearers (including the bearers terminated at the target master base station and the target secondary base station), to which the data forwarding tunnel is allocated by the target side, the target master base station informs the target mobile management entity whether the bearers are terminated at the master base station or the secondary base station. The target base station may include indication information that the bearer is terminated at the master base station or terminated at the secondary base station in the bearer information.

At step 1410, the target mobility management entity receives the data forwarding tunnel information of the one or more bearers and information that the bearer is terminated at the master base station or terminated at the secondary base station from the target base station.

For a bearer terminated at the master base station, if, at step 1405, the target mobility management entity receives the direct forwarding indication or the information on the direct forwarding path availability, it is direct data forwarding; and if, at step 1405, the target mobility management entity does not receive the direct forwarding indication or the information on the direct forwarding path availability, it is indirect data forwarding.

For a bearer terminated at the secondary base station, if the target mobility management entity receives the direct data forwarding path availability from the target base station, it is direct data forwarding, otherwise it is indirect data forwarding.

For a bearer of the indirect data forwarding, the target mobile management entity sends a request message for setting up an indirect data forwarding tunnel to the service gateway. The service gateway sends a response message for setting up the indirect data forwarding tunnel to the target mobile management entity. The response message includes the information on the indirect data forwarding tunnel allocated for each bearer in the request message by the service gateway.

The target mobility management entity sends a relocation response message to the source access and mobility management entity. For the bearer including the data forwarding tunnel information, the message includes the indication information on direct data forwarding or indirect data forwarding.

At step 1412*a*, in the case of data forwarding, the source access and mobility management entity sends a PDU session update session management context request message to the session management entity. The message includes the data forwarding tunnel information and the indication information on direct data forwarding or indirect data forwarding received by the source access and mobility management entity.

At step 1412*b*, for the bearer of indirect data forwarding, the session management entity sends an N4 session modification message to the user plane entity. The session management entity sends the received data forwarding tunnel information to the UPF. The session management entity can also request the UPF to allocate an indirect data forwarding tunnel. The UPF sends a response message to the session management entity, wherein the response message includes information on the indirect data forwarding tunnel allocated by the UPF. The information on the indirect data forwarding tunnel is for the PDU session. For the bearer of direct data forwarding, the session management entity may not include the bearer in the N4 session modification message.

At step 1412*c*, the session management entity sends a PDU session update session management context response message to the source access and mobility management entity. The message includes the data forwarding tunnel information. The data forwarding tunnel information includes the information on the direct data forwarding tunnel and/or the information on indirect data forwarding tunnel. The information on the direct data forwarding tunnel is per E-RAB. The information on the indirect data forwarding tunnel is per PDU session.

At step 1413, the source access and mobility management entity sends a handover command message to the source base station. The message includes the data forwarding tunnel information received by the source access and mobility management entity. The data forwarding tunnel information is the same as that described in step 1412*c*, and will not be repeated here.

The source base station forwards data according to the received data forwarding tunnel information. If the source base station receives the data forwarding tunnel of an E-RAB and the data forwarding tunnel of a PDU session at the same time, the source base station forwards data to the E-RAB tunnel according to the E-RAB identity to which a QoS flow is mapped. The source base station forwards data on the PDU session tunnel to which a QoS flow belongs.

So far, the description of the twelfth embodiment of the present disclosure has been completed. With this method, in the case that the direct data forwarding path between the source base station and the target master base station is unavailable and the direct data forwarding path between the source base station and the target secondary base station is available, the direct data forwarding from the source base station to the target secondary base station can still be supported, and the data can be correctly forwarded to the corresponding data forwarding tunnel, thus improving the data forwarding efficiency, reducing data loss during the handover procedure and improving the handover performance.

Figure 15:
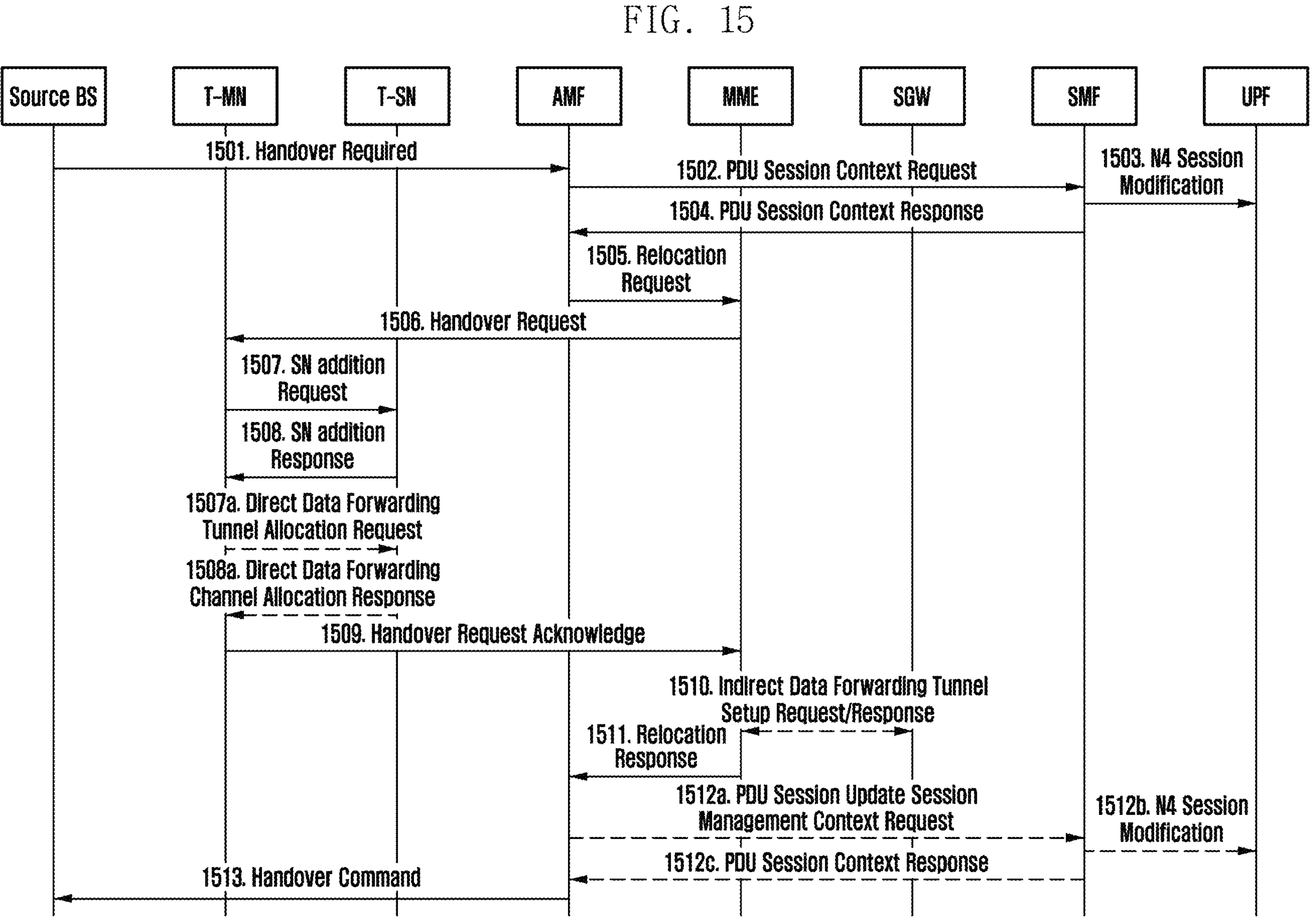
FIG. 15 illustrates a schematic diagram of a thirteenth embodiment according to the embodiment of the present disclosure.

FIG. 15 illustrates a schematic diagram of the thirteenth embodiment. This embodiment is illustrated by taking the handover from the 5G to the EN-DC as an example, and it is also applicable to other inter-system handover or intra-system handover situations. The description of steps irrelevant to the present disclosure is omitted here. This embodiment includes the following steps.

At step 1501, the source base station sends a handover required message to the access and mobility management entity. The access and mobility management entity is an access and mobility management entity serving the UE at the source base station, also known as the source access and mobility management entity. The access and mobility management entity in the 5G system is the AMF. If the direct forwarding path between the source base station and the target base station is available, the handover required message includes information on direct forwarding path availability, and a source-to-target transparent container in the handover required message can also include the information on the direct forwarding path availability at the same time. The target base station is the target master base station. The message includes identification information on the source base station. The identification information on the source base station may be included in the source-to-target transparent container. The message includes evolved radio access bearer (E-RAB) information provided for data forwarding by the source base station. The E-RAB information provided for data forwarding by the source base station can be included in the source-to-target transparent container.

Steps 1502 to 1505 are the same as steps 1402 to 1405, and will not be repeated here.

At Step 1506, the target mobility management entity sends a handover request message to the target base station. The target base station is the target master base station. The message includes an identifier of the source base station. The message includes information on direct forwarding path availability. The information on the direct forwarding path availability can be included in the source-to-target transparent container by the source base station or directly included in the handover request message by the target core network entity. The information on the direct forwarding path availability means that the direct forwarding path between the source base station and the target base station is available.

At step 1507, the target base station determines whether to add a secondary base station. If it is determined to add a secondary base station, the target master base station sends a secondary base station addition request message to the secondary base station. The message includes the identifier of the source base station. For a bearer terminated at the secondary base station, the message includes downlink data forwarding information. The secondary base station can also be said as a target secondary base station. The bearer can be said as an E-RAB or EPS bearer, or a data radio bearer, or other bearers; the same applies below.

The secondary base station determines whether direct forward path between the source base station and the secondary base station is available.

The technical effects to be achieved by this embodiment are: in the case that the direct data forwarding path between the source base station and the target master base station is unavailable and the direct data forwarding path between the source base station and the target secondary base station is available, the direct data forwarding from the source base station to the target secondary base station can be supported; and for a bearer terminated at the target master base station, the data forwarding from the source base station to the target secondary base station and then to the target master base station can be supported, so that the data can be correctly forwarded to the corresponding data forwarding tunnel, thus improving the data forwarding efficiency.

The target master base station knows whether the direct forwarding path between the source base station and the target master base station is available according to whether the information on the direct forwarding path availability is received in the handover request message. If the target master base station does not receive the information on the direct forwarding path availability in the handover request message, the direct forwarding path between the source base station and the target master base station is unavailable. In order to support the data forwarding method, in the present embodiment, there are two ways to allocate information on the data forwarding tunnel between the target master base station and the target secondary base station for the bearer terminated at the target master base station.

In one embodiment of Method 1, it is performed through the secondary base station addition request procedure. For the bearer terminated at the target master base station for which data forwarding is accepted by the target master base station, the target master base station allocates the data forwarding tunnel information from the target secondary base station to the target master base station, and the target master base station includes the allocated tunnel information in the secondary base station addition request message. The target base station requests the target secondary base station to allocate the data forwarding tunnel information from the source base station to the target secondary base station for the corresponding bearer. Corresponding to this method, when the secondary base station determines that the direct forwarding path between the source base station and the secondary base station is available, the information on the data forwarding tunnel from the source base station to the target secondary base station allocated by the target secondary base station is included in the response message in step 1508.

In one embodiment of Method 2, it is completed by step 1507*a* and step 1508*a*. The detailed description is as follows.

At step 1508, the secondary base station sends a secondary base station addition response message to the target master base station. The message includes direct forwarding path availability, the direct forwarding path availability means the direct forwarding path between the secondary base station and the source base station is available. For a bearer terminated at the secondary base station which is accepted to be setup by the secondary base station, for the bearer for which the downlink data forwarding is accepted by the secondary base station, the message includes the information on the data forwarding tunnel allocated by the secondary base station. Corresponding to the method 1 in step 1507, when the secondary base station determines that the direct forwarding path between the source base station and the secondary base station is available, the information on the data forwarding tunnel from the source base station to the target secondary base station allocated by the target secondary base station is included in the response message.

At step 1507*a*, the target master base station receives the information that the direct forwarding path between the source base station and the secondary base station is available from the secondary base station. For the bearer terminated at the target master base station for which the data forwarding is accepted by the target master base station, the target master base station allocates the information on the data forwarding tunnel from the target secondary base station to the target master base station. The target master base station sends a message to the secondary base station, and the message includes the information on the data forwarding tunnel from the target secondary base station to the target master base station allocated by the target master base station. The target master base station requests the target secondary base station to allocate the information on the data forwarding tunnel from the source base station to the target secondary base station for the corresponding bearer.

At step 1508*a*, the secondary base station receives the request message. The secondary base station saves the received data forwarding tunnel information. The secondary base station allocates the information on the data forwarding tunnel from the source base station to the target secondary base station. The secondary base station sends a response message to the target master base station. The message includes the information on the data forwarding tunnel from the source base station to the target secondary base station allocated by the secondary base station.

At step 1509, the target master base station sends a handover request acknowledge message to the target mobility management entity. The message includes that direct forwarding path availability, which means that a direct forwarding path between the secondary base station and the source base station is available.

At step 1510, the target mobility management entity receives the data forwarding tunnel information of one or more bearer from the target base station.

If the target mobility management entity receives, at step 1505, the direct forwarding indication or the information on the direct forwarding path availability or receives the direct data forwarding path availability from the target base station, it is direct data forwarding, otherwise it is indirect data forwarding.

For the indirect data forwarding, the target mobile management entity sends a request message for setting up an indirect data forwarding tunnel to the service gateway. The service gateway sends a response message for setting up the indirect data forwarding tunnel to the target mobile management entity. The response message includes information on the indirect data forwarding tunnel allocated by the service gateway for each bearer in the request message.

At step 1511, the target mobility management entity sends a relocation response message to the source access and mobility management entity. The message includes the indication information on direct data forwarding or indirect data forwarding, or information on the direct data forwarding path availability.

At step 1512*a*, in the case of data forwarding, the source access and mobility management entity sends a PDU session update session management context request message to the session management entity. The message includes the data forwarding tunnel information and the indication information on direct data forwarding or indirect data forwarding or the information on the direct data forwarding path availability received by the source access and mobility management entity.

At step 1512*b*, for indirect data forwarding, the session management entity sends an N4 session modification message to the user plane entity. The session management entity sends the received data forwarding tunnel information to the UPF. The session management entity can also request the UPF to allocate an indirect data forwarding tunnel. The UPF sends a response message to the session management entity, wherein the response message includes information on the indirect data forwarding tunnel allocated by the UPF. The information on the indirect data forwarding tunnel is for the PDU session.

At step 1512*c*, the session management entity sends a PDU session update session management context response message to the source access and mobility management entity. The message includes the data forwarding tunnel information. The data forwarding tunnel information includes the information on the direct data forwarding tunnel or the information on the indirect data forwarding tunnel. The information on the direct data forwarding tunnel is per E-RAB. The information on the indirect data forwarding tunnel is per PDU session.

At step 1513, the source access and mobility management entity sends a handover command message to the source base station. The message includes the data forwarding tunnel information received by the source access and mobility management entity. The data forwarding tunnel information is the same as that described in step 1512*c*, and will not be repeated here.

The source base station forwards data according to the received data forwarding tunnel information. Corresponding to direct data forwarding, the source base station forwards the data to the E-RAB channel according to the E-RAB identity to which a QoS flow is mapped. The target secondary base station receives the data forwarded from the source base station, for the bearer terminated at the target master base station, the target secondary base station forwards the data to the target master base station.

Corresponding to indirect data forwarding, the source base station forwards data on the PDU session tunnel to which a QoS flow belongs.

So far, the description of the thirteenth embodiment of the present disclosure has been completed. With this method, in the case that the direct data forwarding path between the source base station and the target master base station is unavailable and the direct data forwarding path between the source base station and the target secondary base station is available, the direct data forwarding from the source base station to the target secondary base station can be supported, and for the bearer terminated at the target master base station, the data forwarding from the source base station to the target secondary base station and then to the target master base station can be supported, so that the data can be correctly forwarded to the corresponding data forwarding tunnel, thus improving the data forwarding efficiency and improving the handover performance.

Figure 16:
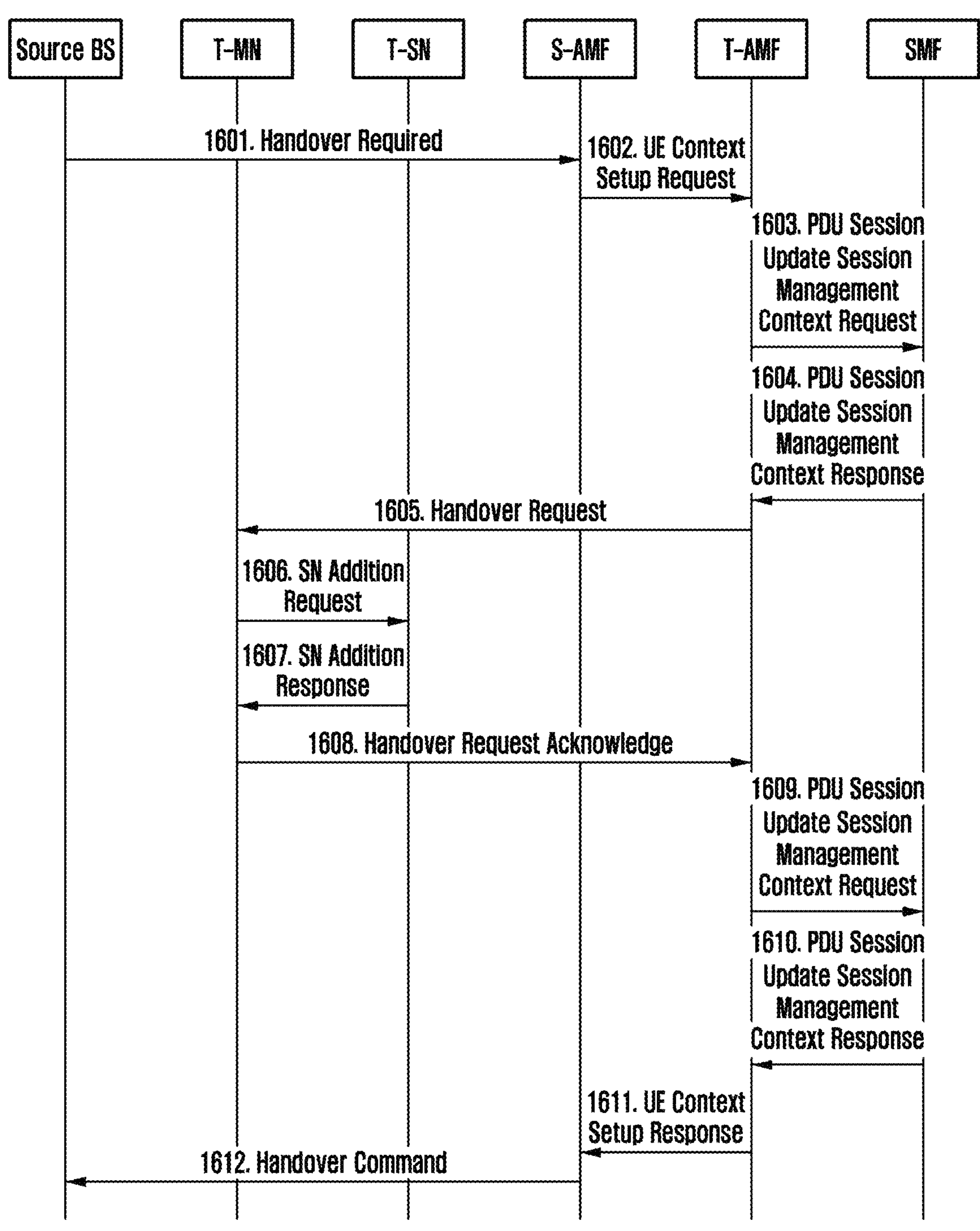
FIG. 16 illustrates a schematic diagram of a fourteenth embodiment according to the embodiment of the present disclosure.

FIG. 16 illustrates a schematic diagram of the fourteenth embodiment. This embodiment is illustrated by taking the handover within the 5G system as an example, and it is also applicable to other cases of intra-system handover. The description of steps irrelevant to the disclosure is omitted here. This embodiment includes the following steps.

At step 1601, the source base station sends a handover required message to the source access and mobility management entity. The access and mobility management entity in the 5G system is the AMF. If the direct forwarding path between the source base station and the target base station is available, the handover required message includes information on the direct forwarding path availability. The target base station is the target master base station. The message includes identification information on the source base station. The identification information of the source base station may be included in a source-to-target transparent container. The message includes information on a QoS flow provided for data forwarding by the source base station and/or a data radio bearer DRB provided for data forwarding. The information on the DRB provided for data forwarding includes one or more QoS flows mapped to the DRB. The information on a QoS flow provided for data forwarding by the source base station and/or a DRB provided for data forwarding may be included in the source-to-target transparent container.

At step 1602, the source access and mobility management entity sends a UE context setup request message to the target access and mobility management entity. The message includes information on direct path forwarding availability.

At step 1603, the target access and mobility management entity sends a PDU session update session management context request message to the session management entity. The session management entity in the 5G system is the SMF. If the target AMF receives the information on the direct forwarding path availability, the message includes the information on the direct forwarding path availability. The description of the procedure between the SMF and the UPF is omitted here.

At step 1604, the session management entity sends a PDU session update session management context response message to the target access and mobility management entity.

At step 1605, the target access and mobility management entity sends a handover request message to the target base station. The target base station is the target master base station. The message includes an identifier of the source base station.

At step 1606, the target base station decides whether to add a secondary base station. If it is decided to add a secondary base station, the target master base station sends a secondary base station addition request message to the secondary base station. The message includes the identifier of the source base station. For a bearer terminated at the secondary base station, the message includes downlink data forwarding information. The secondary base station can also be said as a target secondary base station. The bearer terminated at the secondary base station means that the data of the QoS flow or the PDU session is directly sent from the core network to the secondary base station. The bearer terminated at the secondary base station can also be said as a QoS flow or a PDU session terminated at the secondary base station in the 5G system; the same applies below.

The secondary base station determines whether the direct forward path between the source base station and the secondary base station is available.

At step 1607, the secondary base station sends a secondary base station addition response message to the target master base station. The message includes direct forwarding path availability, the direct forwarding path availability means the direct forwarding path between the secondary base station and the source base station is available. For the bearer terminated at the secondary base station which is accepted to be setup by the secondary base station, for the QoS flow or the PDU session for which the downlink data forwarding is accepted by the secondary base station, the message includes the information on the data forwarding tunnel allocated by the secondary base station. The information on data forwarding tunnel is for the DRB or the PDU session.

At step 1608, the target master base station sends a handover request acknowledge message to the target access and mobility management entity. The message includes direct forwarding path availability, which means that the direct forwarding path between the secondary base station and the source base station is available. For the bearers (including the bearers terminated at the target master base station and the target secondary base station), to which the data forwarding tunnel is allocated by the target side, the target master base station informs the target mobile management entity whether a bearer is terminated at the master base station or the secondary base station. The target master base station may include indication information that the bearer is terminated at the master base station or terminated at the secondary base station in the bearer information, or the target master base station include indication information that the bearer is terminated at the master base station or terminated at the secondary base station in the information on the DRB or the PDU session, or the target master base station indicates the indication information that whether the DRB tunnel or the PDU session tunnel terminates at the master base station or the secondary base station.

At step 1609, the target access and mobility management entity sends a PDU session update session management context request message to the session management entity. If the target AMF receives the information on the direct forwarding path availability from the target base station, the message includes the information on the direct forwarding path availability. The message includes the session management container information received by the target AMF from the target base station.

The session management entity receives the data forwarding tunnel information of one or more DRBs or PDU sessions, and the information that the one or more DRBs or PDU sessions terminated at the master base station or the secondary base station.

For the bearer terminated at the master base station, if, at step 1603, the SMF receives the direct forwarding indication or the information on the direct forwarding path availability, it is direct data forwarding; and if, at step 1603, the SMF does not receive the direct forwarding indication or the information on the direct forwarding path availability, it is indirect data forwarding.

For the bearer terminated at the secondary base station, if the SMF receives the direct data forwarding path availability from the target base station, it is direct data forwarding, otherwise it is indirect data forwarding.

For the bearer of indirect data forwarding, the SMF sends the data forwarding tunnel information received from the target base station to the UPF, requests the UPF to allocate information on the indirect data forwarding tunnel. The UPF sends information on the allocated indirect data forwarding tunnel to the SMF.

At step 1610, the session management entity sends a PDU session update session management context response message to the target access and mobility management entity. The message includes the data forwarding tunnel information. The data forwarding tunnel information includes the information on the direct data forwarding tunnel and/or the information on the indirect data forwarding tunnel.

At step 1611, the target access and mobility management entity sends a UE context setup response message to the source access and mobility management entity. The message includes the data forwarding tunnel information. The data forwarding tunnel information includes the information on the direct data forwarding tunnel and/or the information on the indirect data forwarding tunnel.

At step 1612, the source access and mobility management entity sends a handover command message to the source base station. The message includes the data forwarding tunnel information received by the source access and mobility management entity. The data forwarding tunnel information is the same as that described in step 1610, and will not be repeated here.

The source base station forwards data according to the received data forwarding tunnel information.

So far, the description of the fourteenth embodiment of the present disclosure has been completed. With this method, in the case that the direct data forwarding path between the source base station and the target master base station is unavailable and the direct data forwarding path between the source base station and the target secondary base station is available, the direct data forwarding from the source base station to the target secondary base station can still be supported, and the data can be correctly forwarded to the corresponding data forwarding tunnel, thus improving the data forwarding efficiency, reducing data loss during the handover procedure and improving the handover performance.

Figure 17:
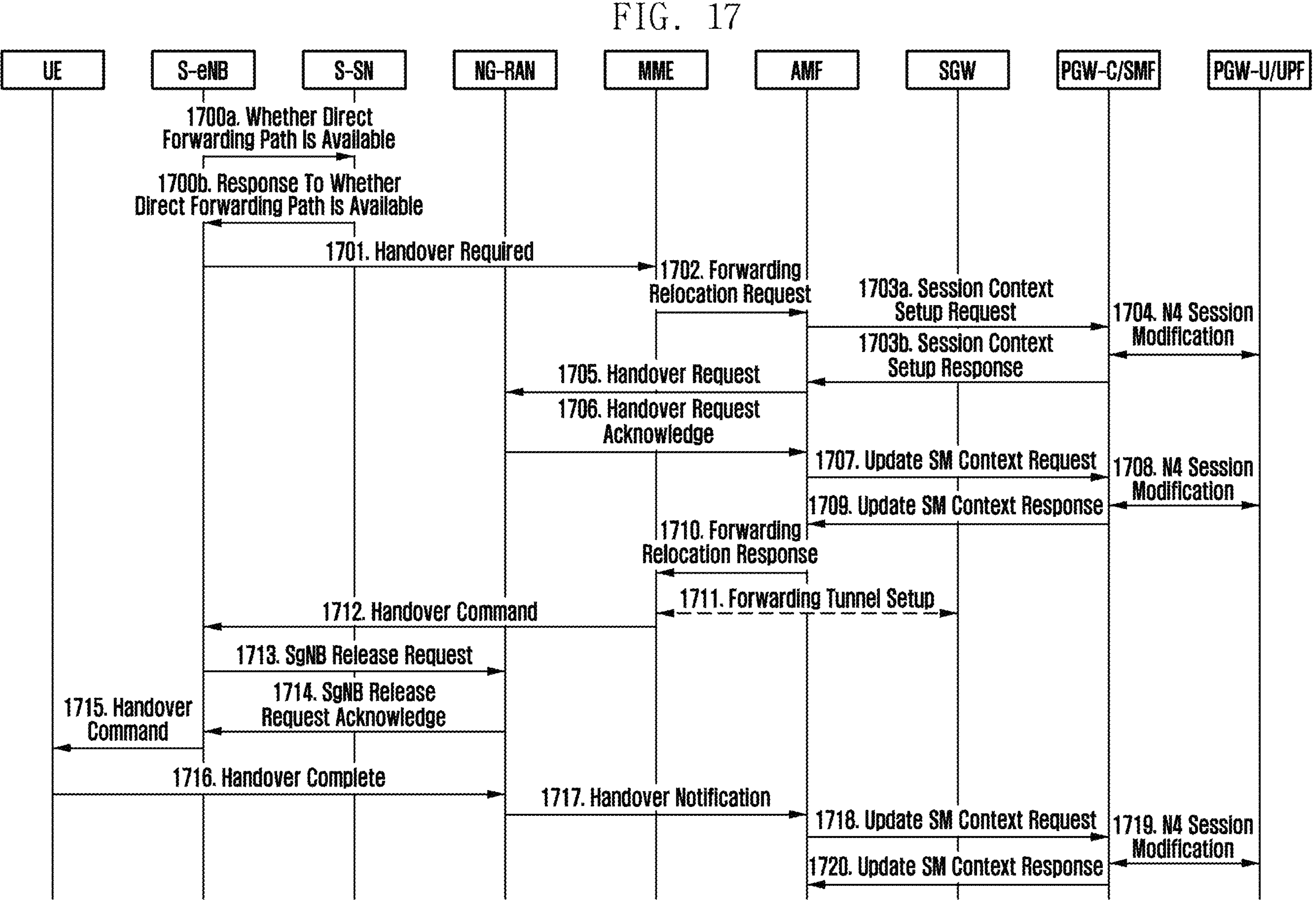
FIG. 17 illustrates a schematic diagram of a fifteenth embodiment according to the embodiment of the present disclosure.

FIG. 17 illustrates a schematic diagram of the fifteenth embodiment of the method for supporting the handover according to the present disclosure. The embodiment is used for the handover from the EN-DC (EUTRA-NR dual connectivity) to the standalone architecture (SA). The detailed description of steps irrelevant to the present disclosure is omitted here. This embodiment includes the following steps.

At step 1700*a*, the source eNB(S-eNB) decides to hand over the UE to the NG-RAN node.

The NG-RAN node here can be the gNB, or the eNB connected to the 5GC, or the gNB centralized unit CU. The eNB connected to the 5GC can also be called the ng-eNB.

The source eNB requests information on whether direct forwarding path between the source SN and the target base station is available from the source SN. The source eNB sends a request message to the source SN, wherein the request message includes an identifier of the target base station. The request message may be a secondary base station modification request message or other messages.

At step 1700*b*, the source SN decides whether the direct forwarding path between the source SN and the target base station is available according to the received identifier of the target base station. The source SN sends a response message to the source eNB. The response message includes information on the direct forwarding path availability. The direct forwarding path availability means that the direct forwarding path between the source SN and the target base station is available. The message can be a secondary base station modification response message or other messages.

At step 1701, the source eNB sends a handover required message to the MME. The message includes a source-to-target transparent container. The message includes information on the direct data forwarding path availability. The message includes the direct data forwarding path availability when the direct data forwarding path between the source eNB and the target base station is available, or the message includes the direct data forwarding path availability when the direct data forwarding path between the source SN and the target base station is available. When the direct data forwarding path between the source eNB and the target base station is available or the direct forwarding path between the source SN and the target base station is available, the source-to-target transparent container in the handover required message may also include the information on the direct forwarding path availability at the same time.

At step 1702, the MME sends a forward relocation request message to an AMF.

The MME sends a direct forwarding indication to the AMF. The direct forwarding indication may indicate the direct data forwarding or the indirect data forwarding. The direct forwarding indication can also be said as a direct forwarding flag. If the MME does not receive the direct data forwarding path availability from the source eNB, the MME decides whether the indirect data forwarding is possible. The MME informs the AMF of the information on whether it is the direct data forwarding or the indirect data forwarding. The MME can also inform the AMF that the data forwarding is not possible, which means that neither direct data forwarding nor indirect data forwarding is possible. Or the MME can also inform the AMF of the information on the direct data forwarding availability.

At step 1703*a*, the AMF sends a session establishment (SM) context request message to the SMF.

The AMF sends the message to each SMF serving the UE.

The AMF sends a direct forwarding indication to the SMF, and the direct forwarding indication can indicate the direct data forwarding or the indirect data forwarding. The AMF informs the SMF of information on whether the direct data forwarding or the indirect data forwarding is available.

At step 1704, the SMF initiates the N4 session modification procedure between the SMF and the UPF.

At step 1703*b*, the SMF sends a session establishment context response message to the AMF. The message includes an N2 session management (SM) information container.

If the SMF receives that direct data forwarding availability, the SMF includes the direct data forwarding path availability in the N2 SM information container. If neither the direct data forwarding nor the indirect data forwarding is available, the SMF includes data forwarding not possible in the N2 SM information container.

At step 1705, the AMF sends a handover request message to the NG-RAN. The message includes the source-to-target transparent container. The source-to-target transparent container here is a source NG-RAN-to-target NG-RAN transparent container.

The message includes the information on direct data forwarding path availability or data forwarding not possible. The information may be included in an N2 SM information container. Data forwarding not possible means that neither the direct nor the indirect data forwarding is possible. The information on the direct data forwarding path availability may also be included in the source-to-target transparent container.

The message may also include mapping relationship from the QoS flow in the PDU session to the EPS bearer, that is, the E-RAB identity to which the QoS flow is mapped and/or the mapped QoS information.

At step 1706, the NG-RAN sends a handover request acknowledge message to the AMF.

The message includes a target-to-source transparent container. The target-to-source transparent container is a target NG-RAN node-to-source NG-RAN node transparent container.

If the target NG-RAN node receives the direct data forwarding path availability, direct data forwarding can be used. In case of direct data forwarding, for a QoS flow for which data forwarding is accepted by the NG-RAN or an E-RAB for which the data forwarding is accepted, the NG-RAN allocates information on downlink data forwarding tunnel for the corresponding E-RAB, and includes the E-RAB identifier and information on the downlink tunnel corresponding to the E-RAB allocated by the NG-RAN in the handover request acknowledge message. In the case of the indirect data forwarding, for a QoS flow for which data forwarding is accepted by the NG-RAN, the NG-RAN allocates the information on the downlink data forwarding tunnel for the PDU session to which the QoS flow belongs, includes the PDU session identifier and the information on the downlink tunnel corresponding to the PDU session allocated by the NG-RAN in the handover request acknowledge message, and can also include the list of QoS flows accepted for data forwarding. If data forwarding is not possible, the NG-RAN does not need to allocate the data forwarding tunnel information.

If the target NG-RAN receives the direct data forwarding path availability, the target NG-RAN allocates the information on downlink data forwarding tunnels for all the E-RABs accepted for data forwarding.

The handover request acknowledge message includes the information on the downlink data forwarding tunnel allocated by the target NG-RAN. The information on downlink data forwarding tunnel may be per E-RAB or per PDU session.

At step 1707, the AMF sends an update SM context request message to the SMF. If tunnel information for data forwarding is received from the NG-RAN, the AMF sends the data forwarding tunnel information received from the NG-RAN to the SMF. The AMF sends the tunnel information for data forwarding received from the NG-RAN to the SMF. The data forwarding tunnel information is the same as that in step 1706, and will not be repeated here.

If the SMF receives the information on the data forwarding tunnel corresponding to each E-RAB, it is the direct data forwarding; if the information on the data forwarding tunnel corresponding to each PDU session is received, it is the indirect data forwarding; and if there is no the information on the data forwarding tunnel, the data forwarding is not possible or the data forwarding is not accepted by the target base station.

At Step 1708, the SMF initiates a session modification procedure with the UPF.

At step 1709, the SMF sends an update SM context response message to the AMF. The SMF sends the tunnel information for data forwarding to the AMF.

At step 1710, the AMF sends a relocation response message to the MME. The message includes the data forwarding tunnel information. For the direct data forwarding, the data forwarding tunnel information is allocated by the target NG-RAN. For the indirect data forwarding, the data forwarding tunnel information is the information on the tunnel for data forwarding between the SGW and the UPF allocated by the SMF or the UPF.

At step 1711, if the MME receives the tunnel information on data forwarding, for the indirect data forwarding, the MME sends a non-direct data forwarding tunnel setup request message to the SGW. The message is used to send the tunnel information on data forwarding between the SGW and the UPF to SGW. The SGW sends a non-direct data forwarding tunnel setup response message to the MME. The message includes information on uplink tunnel for the S1 interface data forwarding allocated by the SGW. For the direct data forwarding, the step does not need to be performed. The MME knows whether it is direct data forwarding or indirect data forwarding according to the information on the direct data forwarding path availability received from the source base station, the details of which is as described in step 1702.

At step 1712, the MME sends a handover command message to the source eNB. The message includes a target-to-source transparent container.

The message includes the data forwarding tunnel information. For the indirect data forwarding, the tunnel information is allocated by the SGW. For the direct data forwarding, the tunnel information is allocated by the target NG-RAN node.

At step 1713, the source eNB sends a secondary base station release request message to the source SN.

If the direct forwarding path between the source eNB and the target base station is not available and the direct forwarding path between the source SN and the target base station is available, for the bearer which is terminated at the source master base station and for which the data forwarding is accepted by the target base station, the source eNB requests the source SN to allocate the data forwarding tunnel information for data forwarding from the source eNB to the source SN. For a bearer terminated at the source SN, the source eNB sends the received data forwarding tunnel information to the source SN.

If the direct forwarding path between the source eNB and the target base station is available and the direct forwarding path between the source SN and the target base station is unavailable, for the bearer terminated at the source SN, the source eNB allocates the data forwarding tunnel information for forwarding data from the source SN to the source eNB, and sends it to the source SN.

Otherwise, the behavior of the source eNB is the same as that of the existing one.

At step 1714, the source SN sends a secondary base station release request acknowledge message to the source MN. If the source eNB requests the source SN to allocate the data forwarding tunnel information for data forwarding from the source eNB to the source SN, the source SN allocates the data forwarding tunnel information for the bearer, and includes the allocated data forwarding tunnel information in the secondary base station release request acknowledge message.

At step 1715, the source eNB sends a handover command message to the UE.

The source eNB forwards data. For the E-RAB for which the data forwarding tunnel is received, it means that the target base station accepts the data forwarding, and the source eNB forwards the data to the corresponding channel.

If the direct forwarding path between the source eNB and the target base station is unavailable and the direct forwarding path between the source SN and the target base station is available, the source eNB forwards the data to the source SN and the data is forwarded to the target base station by the source SN. At step 1714, the source eNB receives the information on the data forwarding tunnel allocated by the source SN.

At step 1716, the UE sends a handover complete message to the NG-RAN.

At step 1717, the NG-RAN sends a handover notification message to the AMF. The message includes tunnel information for downlink data transmission allocated by the NG-RAN.

At step 1718, the AMF sends an update SM context request message to the SMF.

At step 1719, the SMF sends an N4 session modification message to the UPF. The UPF sends an N4 session modification response message to the SMF.

The AMF sends the tunnel information on downlink data transmission allocated by the NG-RAN to the UPF through the SMF.

At step 1720, the SMF sends an update SMF context response message to the AMF.

Figure 18:
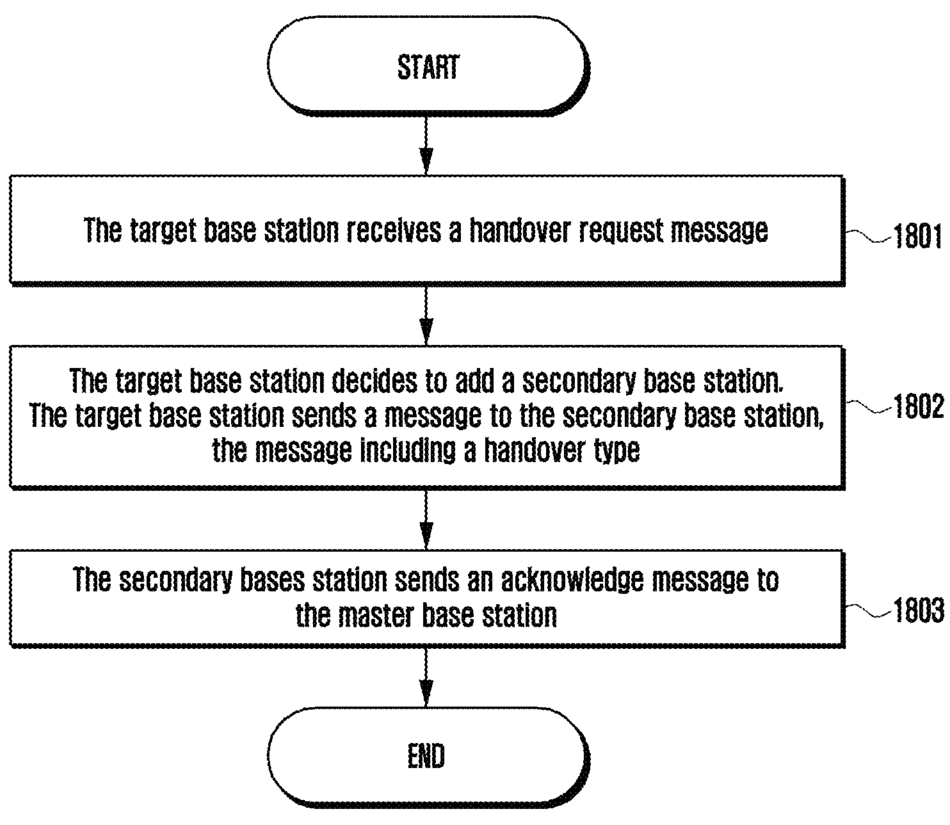
FIG. 18 illustrates a schematic diagram of a sixteenth embodiment according to the embodiment of the present disclosure.

So far, the description of the fifteenth embodiment of the present disclosure has been completed. With this method, in the case that the direct data forwarding path between the source master base station and the target base station is unavailable and the direct data forwarding path between the source secondary base station and the target base station is available, the direct data forwarding from the source secondary base station to the target base station can be supported. For a bearer terminated at the source master base station, the data forwarding from the source master base station to the source secondary base station and then to the target base station can be supported, so that the data can be correctly forwarded to the corresponding data forwarding tunnel, thus improving the data forwarding efficiency and improving the handover performance FIG. 18 illustrates a schematic diagram of the sixteenth embodiment of the present disclosure, which is mainly described from the perspective of the target base station. It includes the following steps.

At step 1801, the target base station receives a handover request message from the core network or the source base station.

The handover request message includes an identifier of the source base station. For the handover request message received from the core network, the identifier of the source base station may be included in the source-to-target transparent container from the source to the target.

For the intra-system handover, the handover request message may be received directly from the source base station. For the inter-system handover or the intra-system handover, the handover request message may be received from the core network. The handover request message received from the core network includes a handover type. The handover type may be the intra-5G system (Intra5GS) handover, the handover from the 5GS to the EPS, the handover from the EPS to the 5GS, the handover from the 5GS to the universal terrestrial radio access (UTRA), etc., and the handover types are not limited here. The message includes that the data forwarding is not possible. If the target base station receives the handover request message directly from the source base station, the target base station knows that it is the intra-system handover.

The handover request message may also include information on direct forwarding path availability. The information on the direct forwarding path availability may be received from the source base station (for example, from the source-to-target transparent container in the handover request message) or from the core network (the information on the direct forwarding path availability is directly included in the handover request message).

For the handover from the EPS to the 5GS, when data forwarding is possible (for example, the information element "data forwarding not possible" does not exist), absence of the information on the direct forwarding path availability means that indirect data forwarding is possible. The message includes the uplink user plane transport layer address.

At step 1802, the target base station decides to add a secondary base station. In this case, the target base station can also be called target master base station, and the secondary base station can also be called the target secondary base station, the same is applied below. The target base station sends a message to the secondary base station. The message can be a secondary base station addition request message. The message includes the handover type. The handover type is information on the intra-system handover or the inter-system handover, or a specific handover type, such as the intra-5GS system handover, the handover from the 5GS to the EPS, the handover from the EPS to the 5GS, the handover from the 5GS to the universal terrestrial radio access (UTRA), etc., and the handover types are not limited here. The message includes the identifier of the source base station. The message includes downlink data forwarding.

At step 1803, the secondary base station receives the message of step 1802. The secondary base station decides whether the direct forwarding path between the secondary base station and the source base station is available. The secondary base station decides whether the direct forwarding path between the secondary base station and the source base station is available according to the received identifier of the source base station. If the secondary base station accepts the downlink data forwarding, the secondary base station allocates the data forwarding tunnel information which includes a TEID and a transport layer address, according to the handover type and/or the information on whether it is direct data forwarding or indirect data forwarding.

For example, for the intra-5G system handover and the direct data forwarding, the secondary base station allocates the transport layer address supported by the Xn-U or allocates the transport layer address from the space of the transport layer addresses reserved for the source base station; for the intra-5G system handover and the indirect data forwarding, the secondary base station allocates the transport layer address supported by the 5G core network; for the inter-system handover from the 4G to the 5G and the direct data forwarding, the secondary base station allocates the transport layer address supported by the X2-U or allocates the transport layer address from the space of the transport layer addresses reserved for the source eNB; and for the inter-system handover from the 4G to the 5G and the indirect data forwarding, the secondary base station allocates the transport layer address supported by the 5G core network.

The secondary base station knows the transport layer address version supported by the source base station or the source eNB or the X2-U or the Xn-U according to the operation and maintenance (O & M) configuration; or the secondary base station knows the transport layer address space reserved for the source base station or the source eNB or the X2-U or the Xn-U according to the O & M configuration. For indirect data forwarding, the secondary base station knows the transport layer address version supported by the core network according to the received uplink (UL) user plane (UP) transport layer address information, so as to allocate the transport layer address in the corresponding version. If the transport layer address received by the secondary base station includes the IPv4 and the IPv6, the secondary base station allocates the transport layer address in the corresponding version for user data forwarding according to the version of the transport layer address supported by itself.

The secondary base station sends an acknowledge message to the target base station. The message may be a secondary base station addition request acknowledge message. The message includes the information on the data forwarding tunnel allocated by the secondary base station. The information on the data forwarding tunnel information includes a TEID and a transport layer address.

For a bearer terminated at the target master base station, if the target master base station accepts the downlink data forwarding, the target master base station allocates the transport layer address in the data forwarding tunnel information according to the information on the direct forwarding path availability and the information on whether it is intra-system handover or inter-system handover received from the handover request message.

For example, for the intra-5G system handover and the direct data forwarding, the target master base station allocates the transport layer address supported by the Xn-U or allocates the transport layer address from the space of transport layer addresses reserved for the source base station; for the intra-5G system handover and the indirect data forwarding, the target master base station allocates the transport layer address supported by the 5G core network; for the inter-system handover from the 4G to the 5G and the direct data forwarding, the target master base station allocates the transport layer address supported by the X2-U or allocates the transport layer address from the space of transport layer addresses reserved for the source eNB; and for the inter-system handover from the 4G to the 5G and the indirect data forwarding, the target master base station allocates the transport layer address supported by the 5G core network. The target master base station knows the transport layer address version supported by the source base station or the source eNB or the X2-U or the Xn-U according to the operation and maintenance (O & M) configuration; or the target master base station knows the transport layer address space reserved for the source base station or the source eNB or the X2-U or the Xn-U according to the O & M configuration. For the indirect data forwarding, the target master base station knows the transport layer address version supported by the core network according to the received uplink (UL) user plane (UP) transport layer address information, so as to allocate the transport layer address in the corresponding version. If the transport layer address received by the secondary base station includes the IPv4 and the IPv6, the target master base station allocates the transport layer address in the corresponding version for user data forwarding according to the transport layer address version supported by itself.

The target base station sends the data forwarding tunnel information to the core network or to the source base station. The data forwarding tunnel information includes the information on the data forwarding tunnel allocated by the target base station and/or the information on the data forwarding tunnel allocated by the secondary base station. For the inter-system handover, the target base station sends a handover request acknowledge message to the core network, the message includes the data forwarding tunnel information. For the direct data forwarding, the target base station sends the data forwarding tunnel information to the source base station through the core network. For the intra-system handover and the direct data forwarding, the target base station can send the data forwarding tunnel information to the source base station through the inter-base station interface (such as the Xn) or through the core network. For the intra-system handover and the indirect data forwarding, the target base station can send the data forwarding tunnel information to the core network, and the core network allocates the information on the indirect data forwarding tunnel and sends it to the source base station.

The source base station forwards data according to the received data forwarding tunnel information. Because the transport layer address in the data forwarding tunnel information matches the version of the transport layer address used by the source base station, data forwarding can be performed properly. Thus, it is ensured that the user data are not lost and the user experience is not compromised.

So far, the description of the sixteenth embodiment of the present disclosure has been completed. With this method, in the procedure of the handover from the single connectivity to dual connectivity, the target master base station and the target secondary base station allocate appropriate data forwarding tunnel information to ensure that data forwarding is performed properly, reduce data loss during the handover procedure and improve the handover performance.

Figure 19:
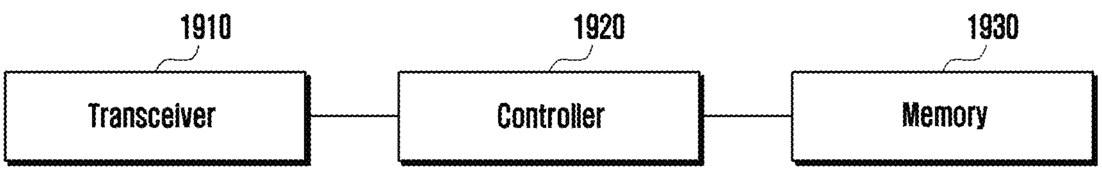
FIG. 19 illustrates a block diagram of a network node device according to an embodiment of the present disclosure.

FIG. 19 illustrates a block diagram of a node device in a network according to the present disclosure.

Node devices in the network can be used to implement a DU, a CU-UP, a CU-CP, a gNB, an eNB source base station, a target base station, a source DU, a source CU-UP, a source CU-CP, a target DU, a target CU-UP, a target CU-CP, a master base station, a secondary base station, etc. in the present disclosure. Referring to FIG. 19, the network device according to the present disclosure includes a transceiver 1910, a controller 1920 and a memory 1930. The transceiver 1910, the controller 1920 and the memory 1930 are configured to perform the operations of the methods and/or embodiments of the present disclosure. Although the transceiver 1910, the controller 1920 and the memory 1930 are shown as separated entities, they can be implemented as a single entity, such as a single chip. The transceiver 1910, the controller 1920 and the memory 1930 may be electrically connected or coupled to each other. The transceiver 1910 can send signals to other network devices and receive signals from other network entities, such as a UE, a base station or a core network node. The controller 1920 may include one or more processing units, and may control network devices to perform operations and/or functions according to one of the above embodiments. The memory 1930 may store instructions for implementing the operations and/or functions of one of the above embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a centralized unit-control plane (CU-CP) of a target base station in a wireless communication network, the method comprising:

receiving, by the CU-CP, a handover request message from a core network node;

transmitting, by the CU-CP to a CU-user plane (UP) of the target base station, a first message including a data forwarding information request, and first information on direct forwarding path availability; and receiving, by the CU-CP from the CU-UP, a second message including second information related to data forwarding, wherein the second information related to the data forwarding includes a tunnel endpoint identifier (TEID) and a transport layer address for inter-system direct data forwarding, and wherein the transport layer address is an internet protocol (IP) address and is assigned by the CU-UP from an address space reserved for a source base station, and wherein the second information related to the data forwarding is assigned by the CU-UP for the inter-system direct data forwarding between a 5G system (5GS) and an evolved packet core (EPC), in case that the first information on the direct forwarding path availability in the first message is set to inter-system direct path available.

2. The method of claim 1, further comprising:

transmitting, by the CU-CP to the core network, a handover request acknowledge message including third information related to the data forwarding.

3. The method of claim 2, further comprising:

receiving, by the CU-UP from a source base station, a data based on the third information related to the data forwarding.

4. A centralized unit-control plane (CU-CP) of a target base station in a wireless communication network, the CU-UP comprising:

a transceiver; and at least one processor configured to:

receive, by the CU-CP, a handover request message from a core network node, transmit, by the CU-CP to a CU-user plane (UP) of the target base station, a first message including a data forwarding information request, and first information on direct forwarding path availability; and receive, by the CU-CP from the CU-UP, a second message including second information related to data forwarding, wherein the second information related to the data forwarding includes a tunnel endpoint identifier (TEID) and a transport layer address for inter-system direct data forwarding, and wherein the transport layer address is an internet protocol (IP) address and is assigned by the CU-UP from an address space reserved for a source base station, and wherein the second information related to the data forwarding is assigned by the CU-UP for the system direct data forwarding between a 5G system (5GS) and an evolved packet core (EPC), in case that the first information on the direct forwarding path availability in the first message is set to inter-system direct path available.

5. The CU-UP of claim 4, wherein the at least one processor is further configured to:

transmit, by the CU-CP to the core network via the transceiver, a handover request acknowledge message including third information related to the data forwarding.

6. The CU-UP of claim 5, wherein the at least one processor is further configured to:

receive, by the CU-UP from a source base station via the transceiver, a data based on the third information related to the data forwarding.

* * * * *